(12) United States Patent
Matsuoka et al.

(10) Patent No.: US 9,448,568 B2
(45) Date of Patent: Sep. 20, 2016

(54) INTELLIGENT CONTROLLER PROVIDING TIME TO TARGET STATE

(71) Applicant: Google Inc., Mountain View, CA (US)

(72) Inventors: Yoky Matsuoka, Palo Alto, CA (US); Rangoli Sharan, Sunnyvale, CA (US); Mark D. Stefanski, Palo Alto, CA (US); Joseph Adam Ruff, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/307,359

(22) Filed: Jun. 17, 2014

(65) Prior Publication Data

US 2014/0364966 A1   Dec. 11, 2014

Related U.S. Application Data

(63) Continuation of application No. 13/875,920, filed on May 2, 2013, now Pat. No. 8,761,946, which is a continuation of application No. 13/632,028, filed on Sep. 30, 2012, now Pat. No. 8,452,457.

(60) Provisional application No. 61/550,343, filed on Oct. 21, 2011.

(51) Int. Cl.
*G05D 23/19* (2006.01)
*G05B 13/04* (2006.01)
(Continued)

(52) U.S. Cl.
CPC ............... *G05D 23/19* (2013.01); *G05B 13/04* (2013.01); *G05D 23/1902* (2013.01); *H04L 12/2825* (2013.01); *H04L 12/40013* (2013.01); *H04L 2012/285* (2013.01)

(58) Field of Classification Search
CPC ............... G05D 23/19; G05D 23/1902; H04L 12/2825; H04L 12/40013; H04L 2012/285; G05B 13/04

USPC ............ 700/28, 29, 30, 275, 276, 278, 299, 700/300; 236/46 R, 91 C, 91 D, 91 E, 91 F
See application file for complete search history.

(56) References Cited

U.S. PATENT DOCUMENTS

| 4,223,831 A | 9/1980 | Szarka |
| 4,274,475 A | 6/1981 | Rall et al. |

(Continued)

FOREIGN PATENT DOCUMENTS

| CA | 2202008 | 8/2000 |
| EP | 0 196 069 A2 | 10/1986 |

(Continued)

OTHER PUBLICATIONS

Honeywell, "T8611G Chronotherm IV Deluxe Programmable Heat Pump Thermostat," pp. 1-24, 1997.

(Continued)

*Primary Examiner* — Charles Kasenge
(74) *Attorney, Agent, or Firm* — Kilpatrick Townsend & Stockton LLP

(57) ABSTRACT

The current application is directed to intelligent controllers that continuously, periodically, or intermittently calculate and display the time remaining until a control task is projected to be completed by the intelligent controller. In general, the intelligent controller employs multiple different models for the time behavior of one or more parameters or characteristics within a region or volume affected by one or more devices, systems, or other entities controlled by the intelligent controller. The intelligent controller collects data, over time, from which the models are constructed and uses the models to predict the time remaining until one or more characteristics or parameters of the region or volume reaches one or more specified values as a result of intelligent controller control of one or more devices, systems, or other entities.

20 Claims, 38 Drawing Sheets

(51) Int. Cl.
*H04L 12/28* (2006.01)
*H04L 12/40* (2006.01)

(56) References Cited

U.S. PATENT DOCUMENTS

| | | | |
|---|---|---|---|
| 4,335,847 A | 6/1982 | Levine | |
| 4,685,614 A | 8/1987 | Levine | |
| 4,751,961 A | 6/1988 | Levine et al. | |
| 5,088,645 A | 2/1992 | Bell | |
| 5,211,332 A | 5/1993 | Adams | |
| 5,240,178 A | 8/1993 | Dewolf et al. | |
| 5,395,042 A | 3/1995 | Riley et al. | |
| 5,476,221 A | 12/1995 | Seymour | |
| 5,555,927 A | 9/1996 | Shah | |
| 5,566,879 A * | 10/1996 | Longtin | G05D 23/1917 165/205 |
| 5,611,484 A | 3/1997 | Uhrich | |
| 5,902,183 A | 5/1999 | D'Souza | |
| 5,909,378 A | 6/1999 | De Milleville | |
| 5,977,964 A | 11/1999 | Williams et al. | |
| 6,062,482 A | 5/2000 | Gaugthier et al. | |
| 6,098,893 A | 8/2000 | Berglund et al. | |
| 6,209,794 B1 | 4/2001 | Webster et al. | |
| 6,216,956 B1 | 4/2001 | Ehlers et al. | |
| 6,349,883 B1 | 2/2002 | Simmons et al. | |
| 6,431,457 B1 | 8/2002 | Dirkes, II | |
| 6,645,066 B2 | 11/2003 | Gutta et al. | |
| 6,769,482 B2 | 8/2004 | Wagner et al. | |
| 7,024,336 B2 | 4/2006 | Salsbury et al. | |
| 7,117,129 B1 | 10/2006 | Bash et al. | |
| RE40,437 E | 7/2008 | Rosen | |
| 7,469,550 B2 | 12/2008 | Chapman, Jr. et al. | |
| 7,596,431 B1 | 9/2009 | Forman et al. | |
| 7,644,869 B2 | 1/2010 | Hoglund et al. | |
| 7,778,734 B2 * | 8/2010 | Oswald | G05B 15/02 340/662 |
| 7,784,704 B2 | 8/2010 | Harter | |
| 7,802,618 B2 | 9/2010 | Simon et al. | |
| 7,854,389 B2 | 12/2010 | Ahmed | |
| 8,090,477 B1 | 1/2012 | Steinberg | |
| 8,386,082 B2 * | 2/2013 | Oswald | G05B 15/02 236/47 |
| 8,452,457 B2 * | 5/2013 | Matsuoka et al. | 700/276 |
| 8,600,562 B2 * | 12/2013 | Oswald | G05B 15/02 340/662 |
| 8,761,946 B2 * | 6/2014 | Matsuoka et al. | 700/276 |
| 9,104,211 B2 * | 8/2015 | Fadell | F24F 11/0012 |
| 2004/0249479 A1 | 12/2004 | Shorrock | |
| 2005/0128067 A1 | 6/2005 | Zakrewski | |
| 2005/0171645 A1 * | 8/2005 | Oswald | G05B 15/02 700/276 |
| 2005/0189429 A1 | 9/2005 | Breeden | |
| 2006/0079983 A1 | 4/2006 | Willis | |
| 2006/0186214 A1 | 8/2006 | Simon et al. | |
| 2006/0196953 A1 | 9/2006 | Simon et al. | |
| 2008/0015742 A1 | 1/2008 | Kulyk et al. | |
| 2008/0065241 A1 | 3/2008 | Boe et al. | |
| 2008/0109100 A1 * | 5/2008 | Macharia | C10L 1/02 700/110 |
| 2008/0191045 A1 | 8/2008 | Harter | |
| 2008/0317292 A1 | 12/2008 | Baker et al. | |
| 2009/0112335 A1 | 4/2009 | Mehta et al. | |
| 2009/0171862 A1 | 7/2009 | Harrod et al. | |
| 2009/0195349 A1 | 8/2009 | Frader-Thompson et al. | |
| 2009/0216380 A1 | 8/2009 | Kolk | |
| 2009/0312999 A1 | 12/2009 | Kasztenny et al. | |
| 2010/0019051 A1 | 1/2010 | Rosen | |
| 2010/0025483 A1 | 2/2010 | Hoeynck et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0211224 A1 | 8/2010 | Keeling et al. | |
| 2010/0262298 A1 | 10/2010 | Johnson et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0035060 A1 * | 2/2011 | Oswald | G05B 15/02 700/278 |
| 2011/0046792 A1 | 2/2011 | Imes et al. | |
| 2011/0046805 A1 | 2/2011 | Bedros et al. | |
| 2011/0153089 A1 | 6/2011 | Tiemann et al. | |
| 2011/0160913 A1 | 6/2011 | Parker et al. | |
| 2011/0185895 A1 | 8/2011 | Freen | |
| 2011/0196539 A1 | 8/2011 | Nair et al. | |
| 2011/0238222 A1 * | 9/2011 | Nikovski | F24F 11/006 700/276 |
| 2011/0251933 A1 | 10/2011 | Egnor et al. | |
| 2012/0016524 A1 * | 1/2012 | Spicer | G05B 15/02 700/276 |
| 2012/0085831 A1 | 4/2012 | Kopp | |
| 2012/0125559 A1 * | 5/2012 | Fadell | F24F 11/0012 165/11.2 |

FOREIGN PATENT DOCUMENTS

| | | |
|---|---|---|
| EP | 762060 | 3/1997 |
| JP | S59-106311 | 6/1984 |
| JP | H1-252850 A2 | 10/1989 |
| JP | H1-310250 A2 | 12/1989 |
| JP | 2002195578 A2 | 7/2002 |
| JP | 2010236708 A2 | 10/2010 |

OTHER PUBLICATIONS

Davis, Gray, "Buildings End-Use Energy Efficiency' Alternatives to Compressor Cooling," California Energy Commission, Jan. 2000.
Aprilaire Electronic Thermostats, User's Manual Installation and Programming, Dec. 2000.
Honeywell, "Perfect Climate Comfort Center Control Systems," pp. 1-44, 2001.
Robertshaw, "9620 Digital Programmable Thermostat User's Manual," pp. 1-14, 2001.
Trane, "TCONT600AF11MA Programmable Comfort Control," pp. 1-14, 2006.
Robertshaw, "9801i2, 9825i2 Deluxe Programmable Thermostats," pp. 1-36, Jul. 17, 2006.
Venstar, "Commercail Thermostat T2900, Owner's Manual," pp. 1-26.2, Apr. 2008.
Lennox, "Owner's Guide, ComforSense 5000 Series Models L5711U and L5732U Programmable Touch Screen Thermostats," 1-32, Feb. 2008.
Gao, Ge, et al., "The Self-Programming Thermostat: Optimizing Setback Schedules based on Home Occupancy Patterns," BuildSys '09, Nov. 3, 2009.
Lennox, "Homeowner's Manual ComfortSense 7000 Series," pp. 1-15, May 2009.
Braeburn, "Premier Series Universal Auto Changeover 5300," pp. 1-15, 2009.
Ecobee, "Smart Thermostat User's Manual," pp. 1-34, 2010.
Lennox, "Homeowner's Manual icomfort Touch Thermostat," pp. 1-20, Dec. 2010.
Washington State University Extension energy Program, "Electic Heat Lock Out on Heat Pumps," pp. 1-3, Apr. 2010.
Lu, Jiakang, et al., "The Smart Thermostat: Using Occupancy Sensors to Save Energy in Homes," pp. 211-224, SenSys, '10, Nov. 3-5, 2010.
Trane, "Trane communicating Thermostats for Fan Coil Control," pp. 1-32, May 2011.
Trane, "Trane Communicating Thermostats for Heat Pump Control," pp. 1-32, May 2011.
Trane, "ComfortLink II Installation Guide," pp. 1-20, Mar. 2011.
Honeywell, "Manual de funcionamiento Prestige THX9321/9421," pp. 1-38, 2011.
Honeywell, "Manuel d'utillsation Focus PRO Serie TH6000," pp. 1-24, 2011.
Honeywell, "Operating Manual FocusPRO TH6000 Series," pp. 1-24, 2011.

(56) References Cited

OTHER PUBLICATIONS

Honeywell, "Manual de funcionamiento," Serie FocusPRO TH6000, pp. 1-24, 2011.
Honeywell, "Manual de Uso," Serie VisionPRO TH8000, pp. 1-30, 2011.
Honeywell, "Automation and Control Solutions," pp. 1-30, 2011.
Ecobee, "Smart Thermostat," pp. 1-31, 2011.
Deleeuw, Scott, "Ecobee WiFi enabled Smart Thermostat Part 2: The Features Review," pp. 1-7, Dec. 2, 2011.
Braeburn, "Premier Series Programmable Thermostats," pp. 1-20, 2011.
Ecobee, "Smart Si Thermostat User Manual," pp. 1-39, 2012.
Carrier, TB-PAC TB-PHP Base Series Programmable Thermostats Installation Instructions, pp. 1-4, 2012.
Carrier, SYSTXCCUIZ01-V Infinity Control, pp. 1-20, 2012.
Honeywell, "THX9321 Prestige 2.0 and THX9421 Prestige IAQ 2.0 with EIM," pp. 1-126, 2012.
Honeywell, "Automoation and Control Solutions Installation Guide," pp. 1-38, 2012.
Honeywell, "Automation and control Systems," pp. 1-29, 2012.
Honeywell, "Installation Guide VisionPRO TH8000 Series," pp. 1-11, 2012.
Honeywell, "Guia de instalacion Serie Focus PRO TH6000," pp. 1-8, 2012.
Honeywell, "Installation Guide FocusPRO TH 6000 Series," pp. 1-8, 2012.
Network Thermostat, "Net/X WiFi Thermostat," 2012.
Venstar, "Residental Thermostat T5800 Owner's Manual and Installation Instructions," pp. 1-23.
White Rodgers, Emerson Blue Wireless Comfort Interface 1F98Ez-1621, pp. 1-26.
Ecobee, "Introducing the New Smart Si Thermostat".
Luxpro, Instruction Manual LuxPro PSPU732T.
"Internet Thermostat Installation Guide," pp. 1-44.
Notice of Publication dated Apr. 25, 2013 for U.S. Appl. No. 13/632,028.
Notice of Allowability mailed Apr. 15, 2013, for U.S. Appl. No. 13/632,028, 2 pages.
Notice of Allowance and Fee(s) Due mailed Jan. 22, 2013, for U.S. Appl. No. 13/632,028, 8 pages.
Notice of Publication mailed Mar. 3, 2014, for U.S. Appl. No. 13/875,920.
Notice of Allowance and Fee(s) Due mailed Mar. 6, 2014, for U.S. Appl. No. 13/875,920, 8 pages.
Applicant-Initiated Interview Summary mailed Feb. 25, 2014, for U.S. Appl. No. 13/875,920, 3 pages.
Non-Final Office Action mailed Oct. 15, 2013, for U.S. Appl. No. 13/875,920, 7 pages.
Notice of Granting Patent Right for Invention for Chinese Patent Application No. 201280051626.4, 8 pages. English Translation.
Office Action mailed Feb. 27, 2015, for Chinese Patent Application No. 201280051626.4, 4 pages. English Translation.
European Supplementary Search Report mailed Nov. 14, 2013, for European Patent Application No. 12842225.0, 7 pages.
International Preliminary Report on Patentability mailed May 1, 2014, for International Application No. PCT/US2012/058183, 7 pages.

* cited by examiner

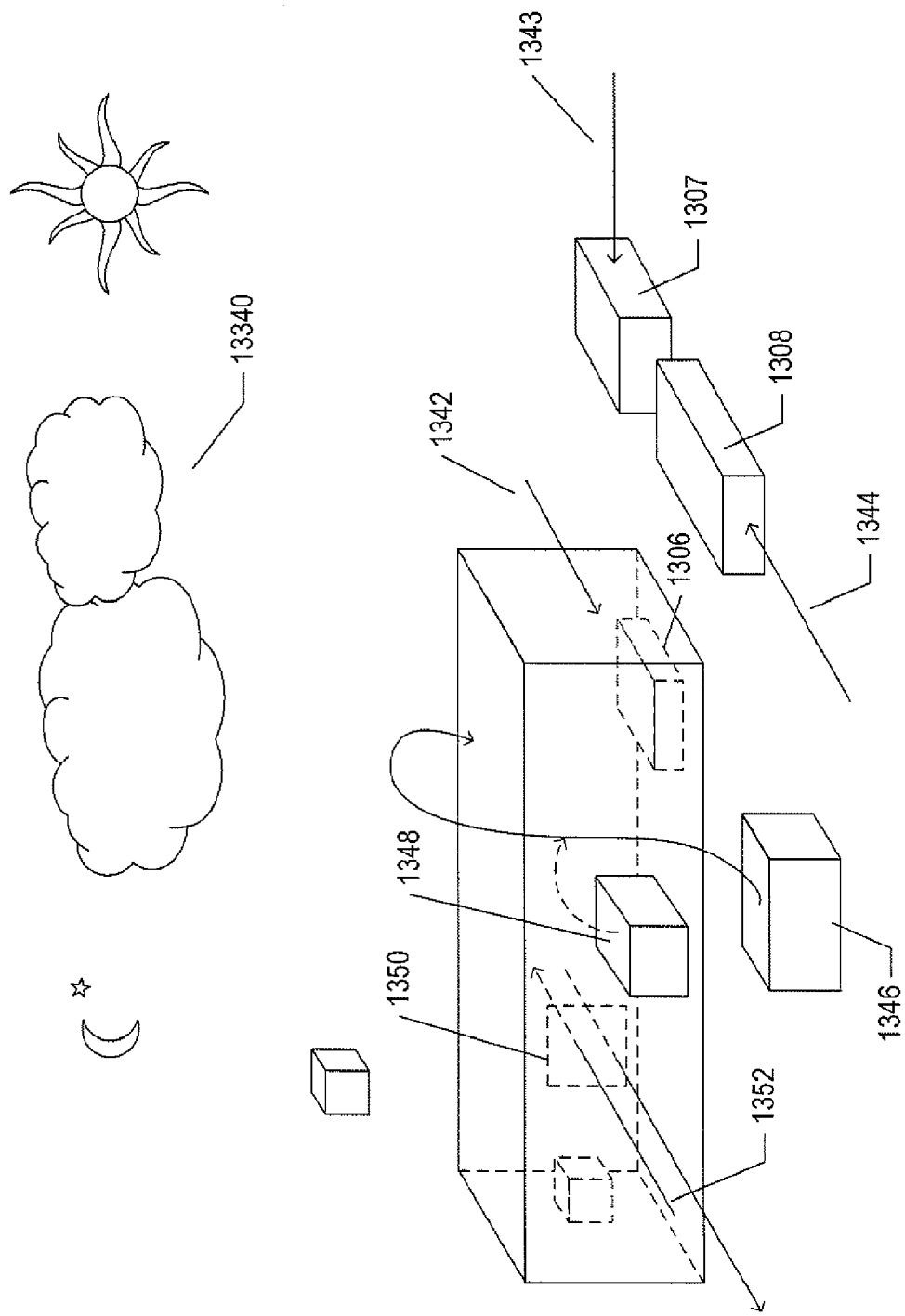

$$\Delta_{o/c_i} = \frac{(\Delta P_o - \Delta P_c)^2}{\Delta P_c}$$

$$\text{fit} = \sum_{i=1}^{N} \Delta_{o/c_i}$$

$$\text{fit} = \begin{cases} 0 \text{ when observed data matches model, and} \\ > 0 \text{ when observed data does not match model} \end{cases}$$

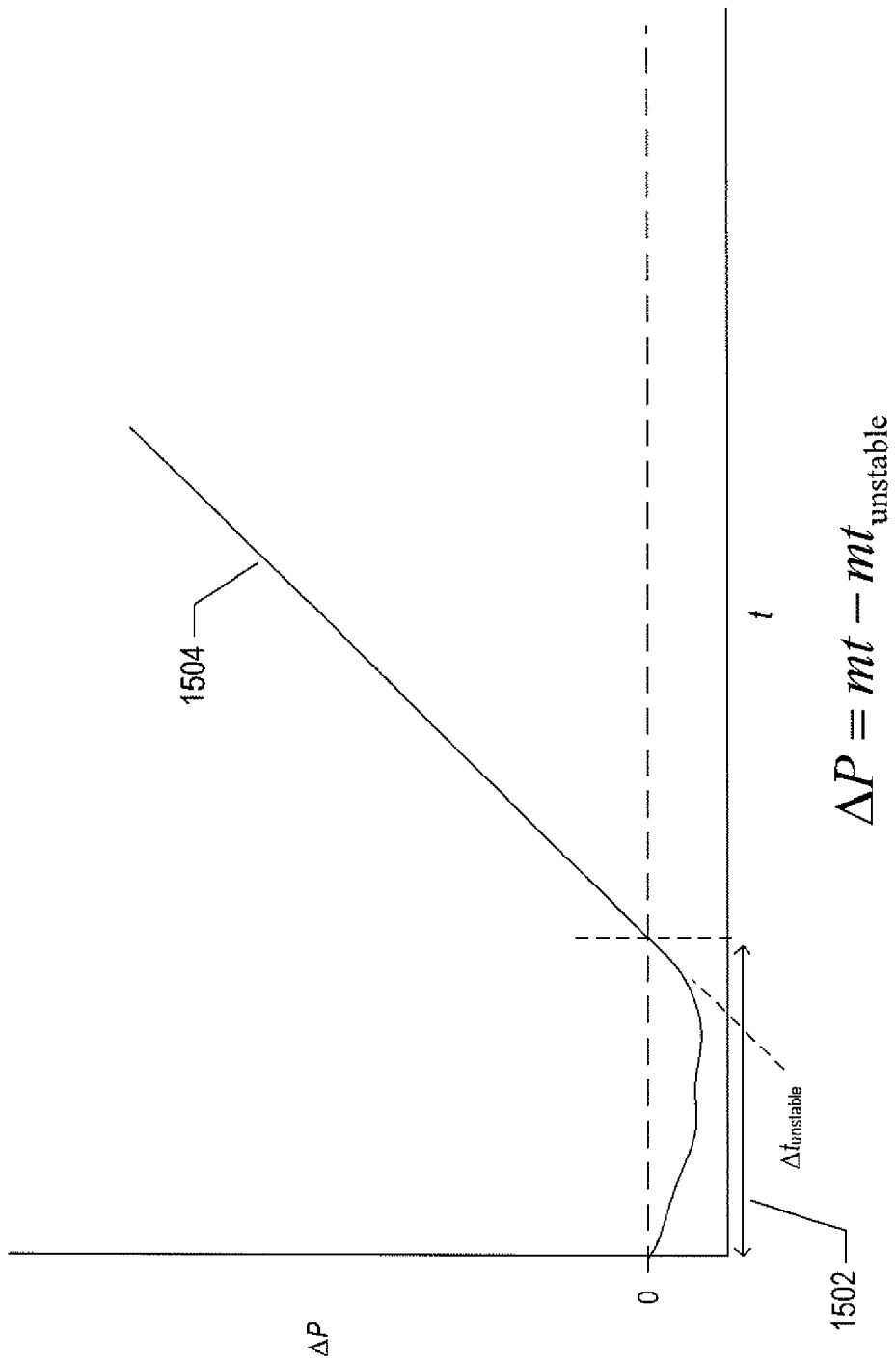

INTELLIGENT CONTROLLER PROVIDING TIME TO TARGET STATE

CROSS-REFERENCE TO RELATED APPLICATION

This application is a continuation of U.S. patent application Ser. No. 13/875,920, filed May 2, 2013, which is a continuation of U.S. patent application Ser. No. 13/632,028, filed Sep. 30, 2012, now U.S. Pat. No. 8,452,457, which claims the benefit of U.S. Provisional Patent Application Ser. No. 61/550,343, filed Oct. 21, 2011. Each of the above-referenced patent applications is incorporated by reference herein.

TECHNICAL FIELD

The current patent application is directed to intelligent controllers and, in particular, to intelligent controllers, and methods incorporated within intelligent controllers, that continuously calculate, store in memory, and display projections regarding the time remaining until a target state is obtained.

BACKGROUND

Control systems and control theory are well-developed fields of research and development that have had a profound impact on the design and development of a large number of systems and technologies, from airplanes, spacecraft, and other vehicle and transportation systems to computer systems, industrial manufacturing and operations facilities, machine tools, process machinery, and consumer devices. Control theory encompasses a large body of practical, system-control-design principles, but is also an important branch of theoretical and applied mathematics. Various different types of controllers are commonly employed in many different application domains, from simple closed-loop feedback controllers to complex, adaptive, state-space and differential-equations-based processor-controlled control systems.

Many modern intelligent controllers include various types of displays, including text and graphical displays and display interfaces that allow text and graphical information to be displayed on any of various local and remote devices interconnected with the intelligent controllers. These displays, as discussed further below, are used for higher-level interactive control-input interfaces and control-schedule interfaces. In addition, many intelligent controllers display continuously, periodically, or intermittently updated information about regions or volumes controlled by the intelligent controllers and information related to control tasks submitted to the intelligent controllers. Designers, developers, manufacturers, and, ultimately, users of intelligent controllers continue to seek new types of information displays and information-display capabilities within, and provided by, intelligent controllers.

SUMMARY

The current application is directed to intelligent controllers that continuously, periodically, or intermittently calculate and display the time remaining until a control task is projected to be completed by the intelligent controller. In general, the intelligent controller employs multiple different models for the time behavior of one or more parameters or characteristics within a region or volume affected by one or more devices, systems, or other entities controlled by the intelligent controller. The intelligent controller collects data, over time, from which the models are constructed and uses the models to predict the time remaining until one or more characteristics or parameters of the region or volume reaches one or more specified values as a result of intelligent controller control of one or more devices, systems, or other entities.

BRIEF DESCRIPTION OF THE DRAWINGS

FIGS. 13A-D illustrate the general context in which intelligent controllers, to which the current application is directed, operate.

FIGS. 15A-B illustrate several types of local modeling techniques.

DETAILED DESCRIPTION

The current application is directed to a general class of intelligent controllers that continuously, periodically, or intermittently calculate the time remaining until one or more characteristics or parameters of a region or volume reach one or more specified values as a result of control, by the intelligent controller, of a device, system, or other entity that operates on, or affects, the region or volume. In addition, the general class of intelligent controllers to which the current application is directed continuously, periodically, or intermittently display an estimate of the time remaining until the one or more characteristics and parameters reach specified values. The current application discloses, in addition to methods and implementations for calculating, storing, and displaying projections of the time remaining for completion of control tasks, a specific example of time-to-temperature methods and time-to-temperature displays in an intelligent controller that serves as a detailed example of the methods for calculating, storing, and displaying projections of the time remaining for completion of input control tasks employed by the general class of intelligent controllers to which the current application is directed. The intelligent thermostat is an example of a smart-home device. The subject matter of this patent specification relates to the subject matter of the following commonly assigned applications, each of which is incorporated by reference herein: U.S. Ser. No. 12/984,602 filed Jan. 4, 2011; and U.S. Ser. No. 13/269,501 filed Oct. 7, 2011.

The detailed description includes three subsections: (1) an overview of the smart-home environment; (2) methods and implementations for calculating, storing, and displaying projections of the time remaining for completion of control tasks; and (3) methods and implementations for calculating, storing, and displaying projections of the time remaining for completion of control tasks in the context of an intelligent thermostat. The first subsection provides a description of one area of technology that offers many opportunities for application and incorporation of methods for displaying remaining-time projections. The second subsection provides a detailed description of a general class of intelligent controllers that determine, store, and display projections of the time remaining for completion of control tasks. The third subsection provides a specific example of time-to-temperature determinations made by intelligent thermostats.

Overview of the Smart-Home Environment

Figure 1:
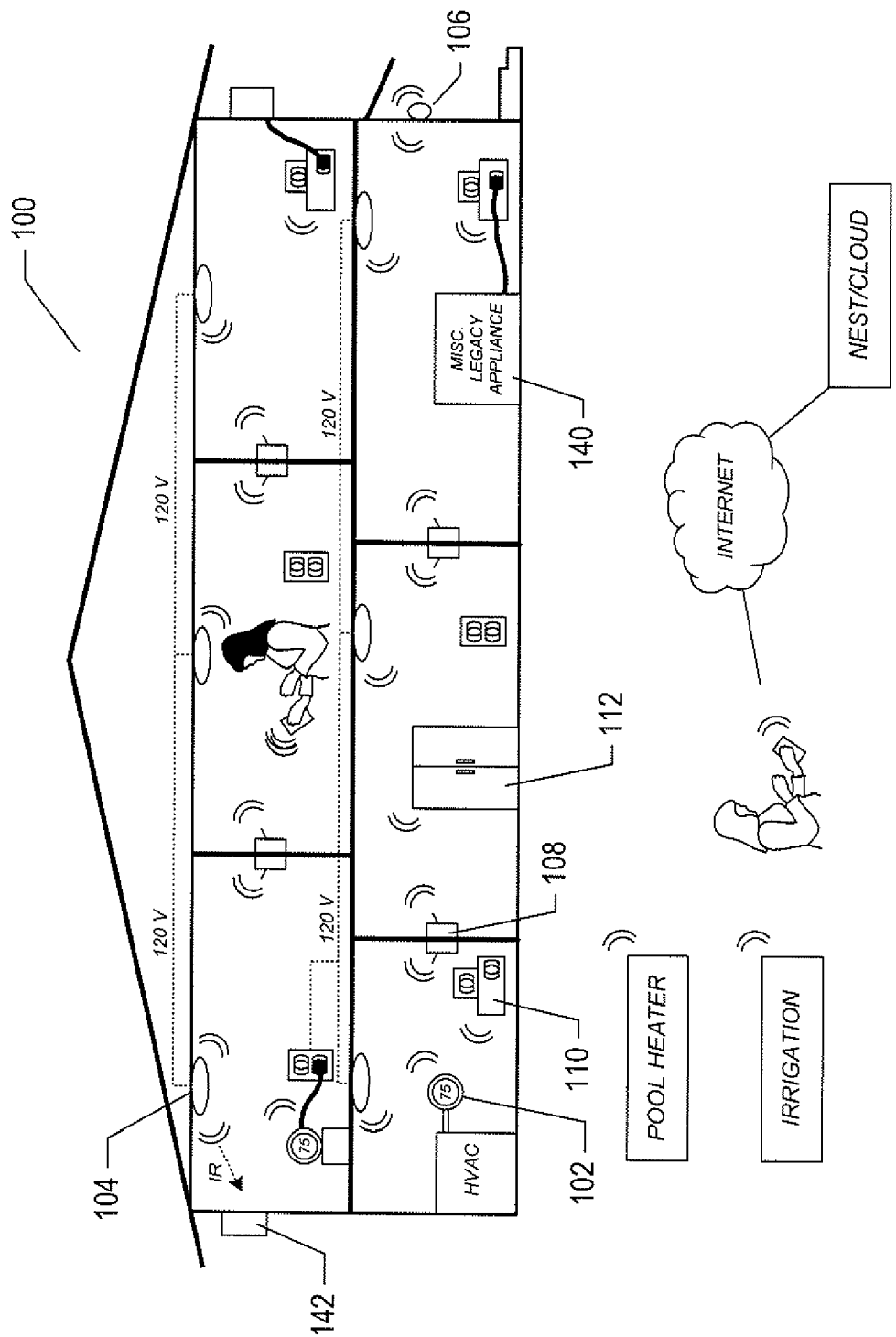
FIG. 1 illustrates a smart-home environment.

FIG. 1 illustrates a smart-home environment. The smart-home environment 100 includes a number of intelligent, multi-sensing, network-connected devices. These smart-home devices intercommunicate and are integrated together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

The smart-home devices may include one more intelligent thermostats 102, one or more intelligent hazard-detection units 104, one or more intelligent entryway-interface devices 106, smart switches, including smart wall-like switches 108, smart utilities interfaces and other services interfaces, such as smart wall-plug interfaces 110, and a wide variety of intelligent, multi-sensing, network-connected appliances 112, including refrigerators, televisions, washers, dryers, lights, audio systems, intercom systems, mechanical actuators, wall air conditioners, pool-heating units, irrigation systems, and many other types of intelligent appliances and systems.

In general, smart-home devices include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications are generally carried out using any of a large variety of different types of communications media and protocols, including wireless protocols, such as Wi-Fi, ZigBee, 6LoWPAN, various types of wired protocols, including CAT6 Ethernet, HomePlug, and other such wired protocols, and various other types of communications protocols and technologies. Smart-home devices may themselves operate as intermediate communications devices, such as repeaters, for other smart-home devices. The smart-home environment may additionally include a variety of different types of legacy appliances and devices 140 and 142 which lack communications interfaces and processor-based controllers.

Figure 2:
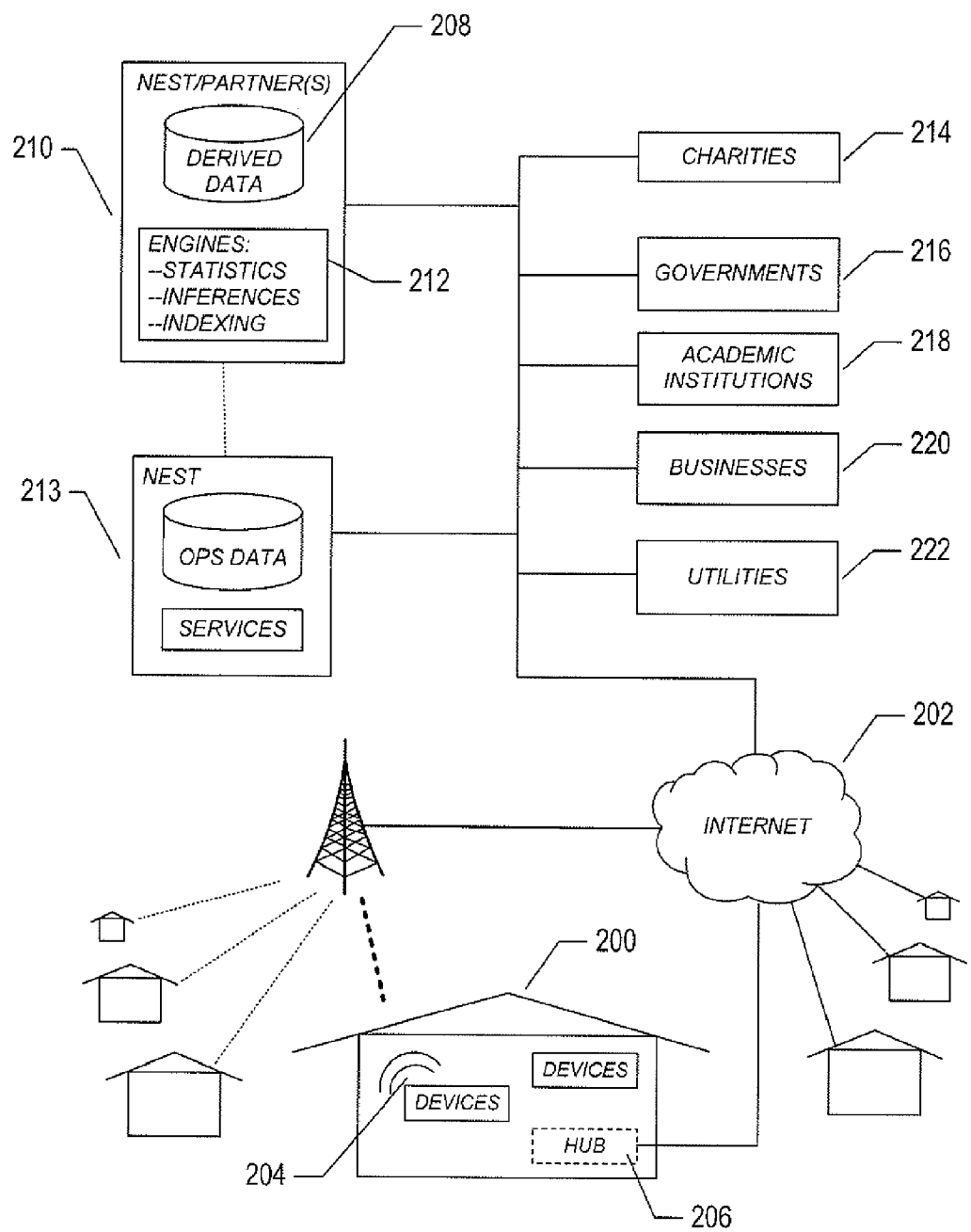
FIG. 2 illustrates integration of smart-home devices with remote devices and systems.

FIG. 2 illustrates integration of smart-home devices with remote devices and systems. Smart-home devices within a smart-home environment 200 can communicate through the Internet 202 via 3G/4G wireless communications 204, through a hubbed network 206, or by other communications interfaces and protocols. Many different types of smart-home-related data, and data derived from smart-home data 208, can be stored in, and retrieved from, a remote system 210, including a cloud-based remote system. The remote system may include various types of statistics, inference, and indexing engines 212 for data processing and derivation of additional information and rules related to the smart-home environment. The stored data can be exposed, via one or more communications media and protocols, in part or in whole, to various remote systems and organizations, including charities 214, governments 216, academic institutions 218, businesses 220, and utilities 222. In general, the remote data-processing system 210 is managed or operated by an organization or vendor related to smart-home devices or contracted for remote data-processing and other services by a homeowner, landlord, dweller, or other smart-home-associated user. The data may also be further processed by additional commercial-entity data-processing systems 213 on behalf of the smart-homeowner or manager and/or the commercial entity or vendor which operates the remote data-processing system 210. Thus, external entities may collect, process, and expose information collected by smart-home devices within a smart-home environment, may process the information to produce various types of derived results which may be communicated to, and shared with, other remote entities, and may participate in monitoring and control of smart-home devices within the smart-home environment as well as monitoring and control of the smart-home environment. Of course, in many cases, export of information from within the smart-home environment to remote entities may be strictly controlled and constrained, using encryption, access rights, authentication, and other well-known techniques, to ensure that information deemed confidential by the smart-home manager and/or by the remote data-processing system is not intentionally or unintentionally made available to additional external computing facilities, entities, organizations, and individuals.

Figure 3:
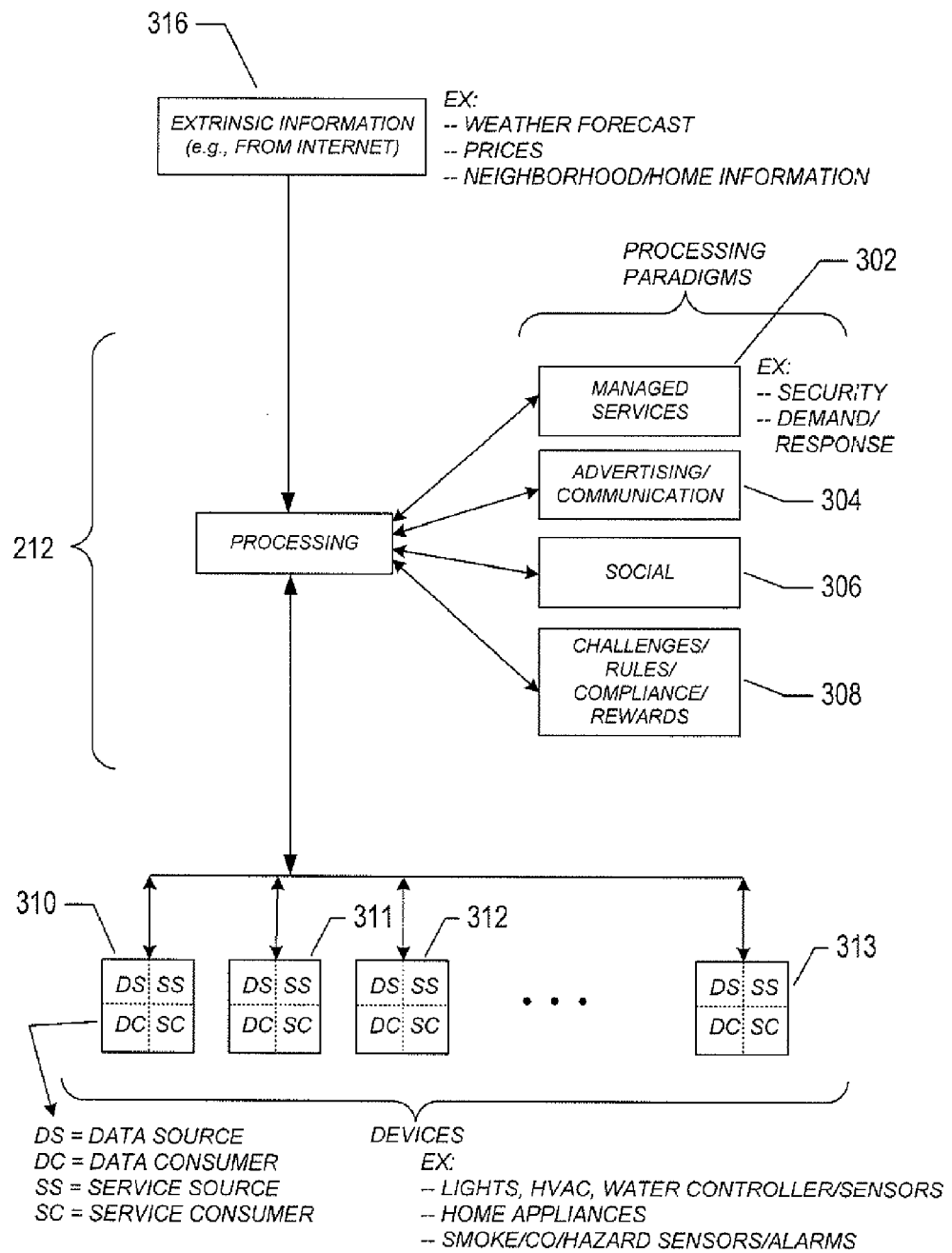
FIG. 3 illustrates information processing within the environment of intercommunicating entities illustrated in FIG. 2.

FIG. 3 illustrates information processing within the environment of intercommunicating entities illustrated in FIG. 2. The various processing engines 212 within the external data-processing system 210 can process data with respect to a variety of different goals, including provision of managed services 302, various types of advertizing and communications 304, social-networking exchanges and other electronic social communications 306, and for various types of monitoring and rule-generation activities 308. The various processing engines 212 communicate directly or indirectly with smart-home devices 310-313, each of which may have data-consumer ("DC"), data-source ("DS"), services-consumer ("SC"), and services-source ("SS") characteristics. In addition, the processing engines may access various other types of external information 316, including information obtained through the Internet, various remote information sources, and even remote sensor, audio, and video feeds and sources.

Figure 4:
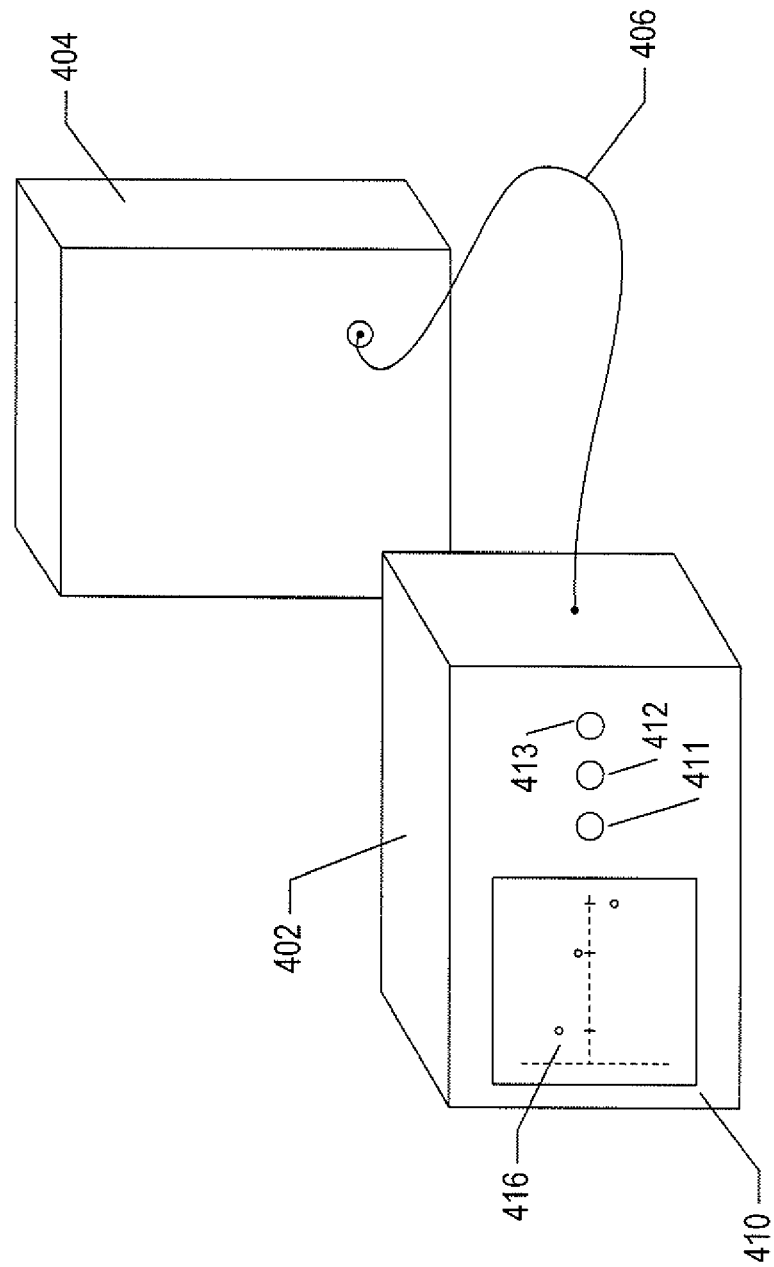
FIG. 4 illustrates a general class of intelligent controllers to which the current application is directed.

Methods and Implementations for Calculating, Storing, and Displaying Projections of the Time Remaining for Completion of Control Tasks FIG. 4 illustrates a general class of intelligent controllers to which the current application is directed. The intelligent controller 402 controls a device, machine, system, or organization 404 via any of various different types of output control signals and receives information about the controlled entity and an environment from sensor output received by the intelligent controller from sensors embedded within the controlled entity 404, the intelligent controller 402, or in the environment. In FIG. 4, the intelligent controller is shown connected to the controlled entity 404 via a wire or fiber-based communications medium 406. However, the intelligent controller may be interconnected with the controlled entity by alternative types of communications media and communications protocols, including wireless communications. In many cases, the intelligent controller and controlled entity may be implemented and packaged together as a single system that includes both the intelligent controller and a machine, device, system, or organization controlled by the intelligent controller. The controlled entity may include multiple devices, machines, system, or organizations and the intelligent controller may itself be distributed among multiple components and discrete devices and systems. In addition to outputting control signals to controlled entities and receiving sensor input, the intelligent controller also provides a user interface 410-413 through which a human user can input immediate-control inputs to the intelligent controller as well as create and modify the various types of control schedules, and may also provide the immediate-control and schedule interfaces to remote entities, including a user-operated processing device or a remote automated control system. In FIG. 4, the intelligent controller provides a graphical-display component 410 that displays a control schedule 416 and includes a number of input components 411-413 that provide a user interface for input of immediate-control directives to the intelligent controller for controlling the controlled entity or entities and input of scheduling-interface commands that control display of one or more control schedules, creation of control schedules, and modification of control schedules.

To summarize, the general class of intelligent controllers to which the current is directed receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. The user interface may be included within the intelligent controller as input and display devices, may be provided through remote devices, including mobile phones, or may be provided both through controller-resident components as well as through remote devices. These basic functionalities and features of the general class of intelligent controllers provide a basis upon which automated control-schedule learning, to which the current application is directed, can be implemented.

Figure 5:
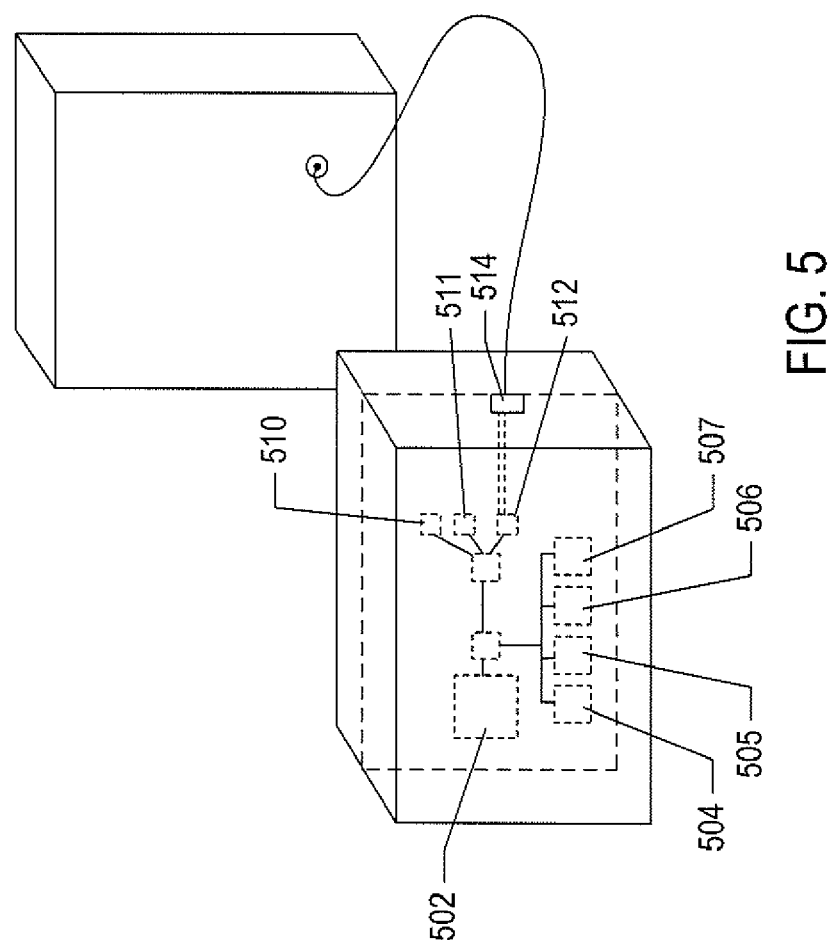
FIG. 5 illustrates additional internal features of an intelligent controller.

FIG. 5 illustrates additional internal features of an intelligent controller. An intelligent controller is generally implemented using one or more processors 502, electronic memory 504-507, and various types of microcontrollers 510-512, including a microcontroller 512 and transceiver 514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of control routines by the one or more processors and slower, non-volatile memories storing control routines and data that need to survive power-on/power-off cycles. Certain types of intelligent controllers may additionally include mass-storage devices.

Figure 6:
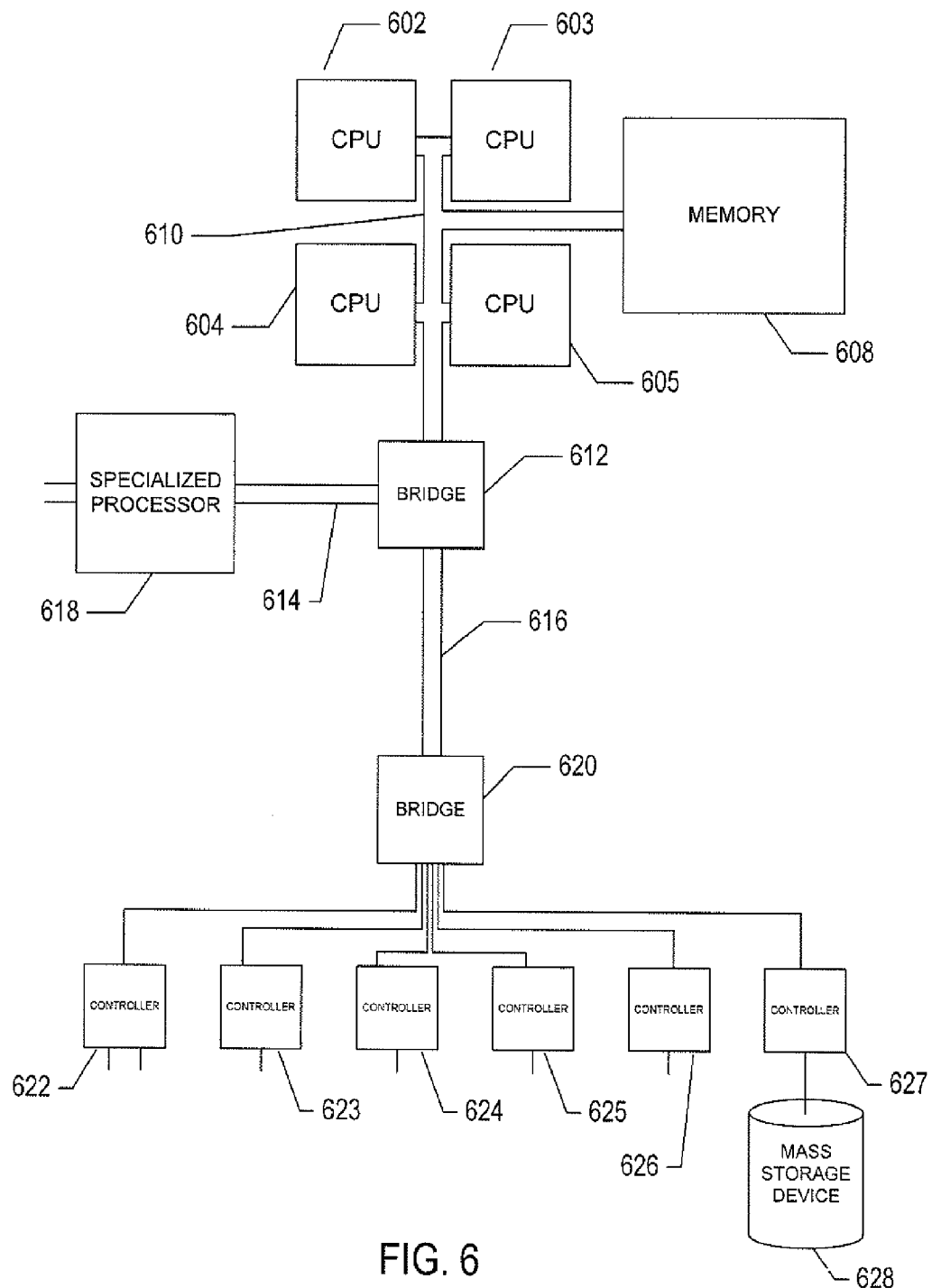
FIG. 6 illustrates a generalized computer architecture that represents an example of the type of computing machinery that may be included in an intelligent controller, server computer, and other processor-based intelligent devices and systems.

FIG. 6 illustrates a generalized computer architecture that represents an example of the type of computing machinery that may be included in an intelligent controller, server computer, and other processor-based intelligent devices and systems. The computing machinery includes one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616 and/or other types of high-speed interconnection media, including multiple, high-speed serial interconnects. These busses and/or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
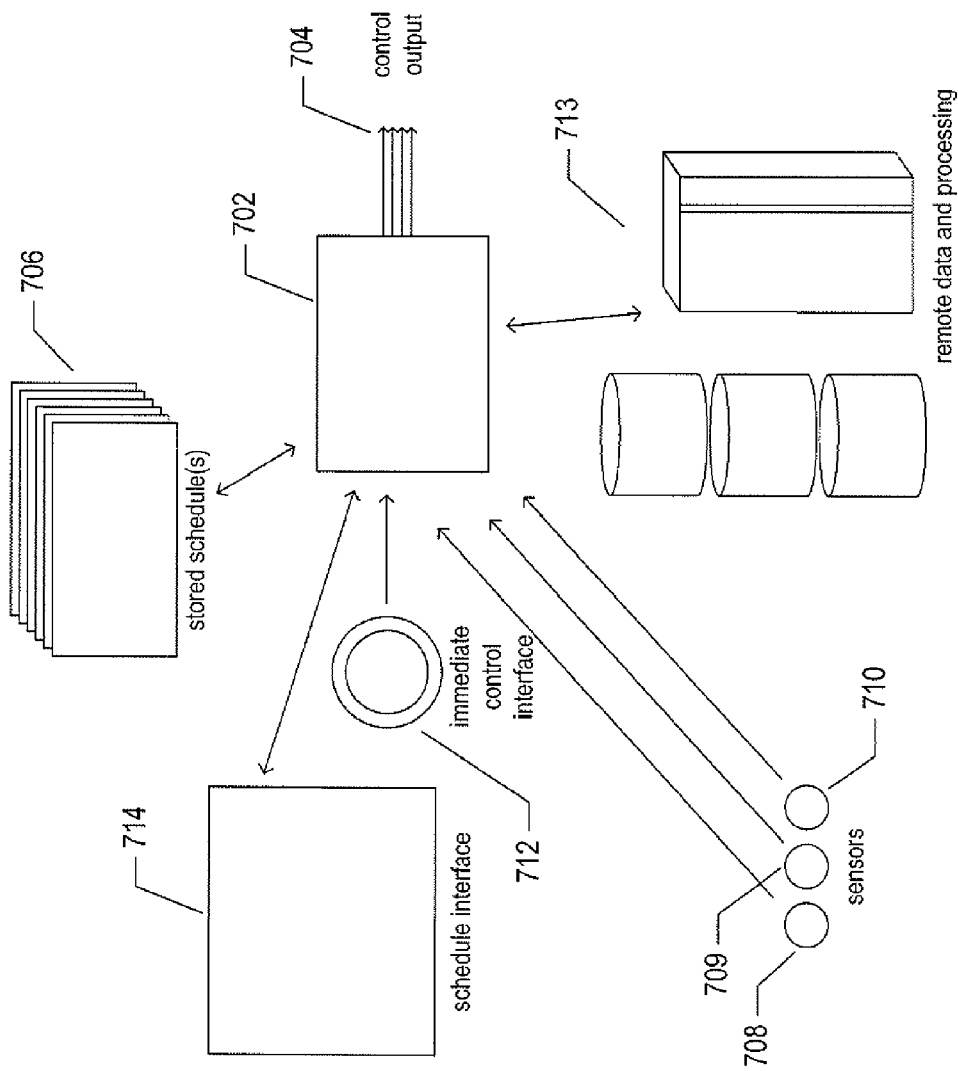
FIG. 7 illustrates features and characteristics of an intelligent controller of the general class of intelligent controllers to which the current application is directed.

FIG. 7 illustrates features and characteristics of an intelligent controller of the general class of intelligent controllers to which the current application is directed. An intelligent controller includes controller logic 702 generally implemented as electronic circuitry and processor-based computational components controlled by computer instructions stored in physical data-storage components, including various types of electronic memory and/or mass-storage devices. It should be noted, at the onset, that computer instructions stored in physical data-storage devices and executed within processors comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices. Similarly, computer-readable media are physical data-storage media, such as disks, memories, and mass-storage devices that store data in a tangible, physical form that can be subsequently retrieved from the physical data-storage media.

The controller logic accesses and uses a variety of different types of stored information and inputs in order to generate output control signals 704 that control the operational behavior of one or more controlled entities. The information used by the controller logic may include one or more stored control schedules 706, received output from one or more sensors 708-710, immediate control inputs received through an immediate-control interface 712, and data, commands, and other information received from remote data-processing systems, including cloud-based data-processing systems 713. In addition to generating control output 704, the controller logic provides an interface 714 that allows users to create and modify control schedules and may also output data and information to remote entities, other intelligent controllers, and to users through an information-output interface.

Figure 8:
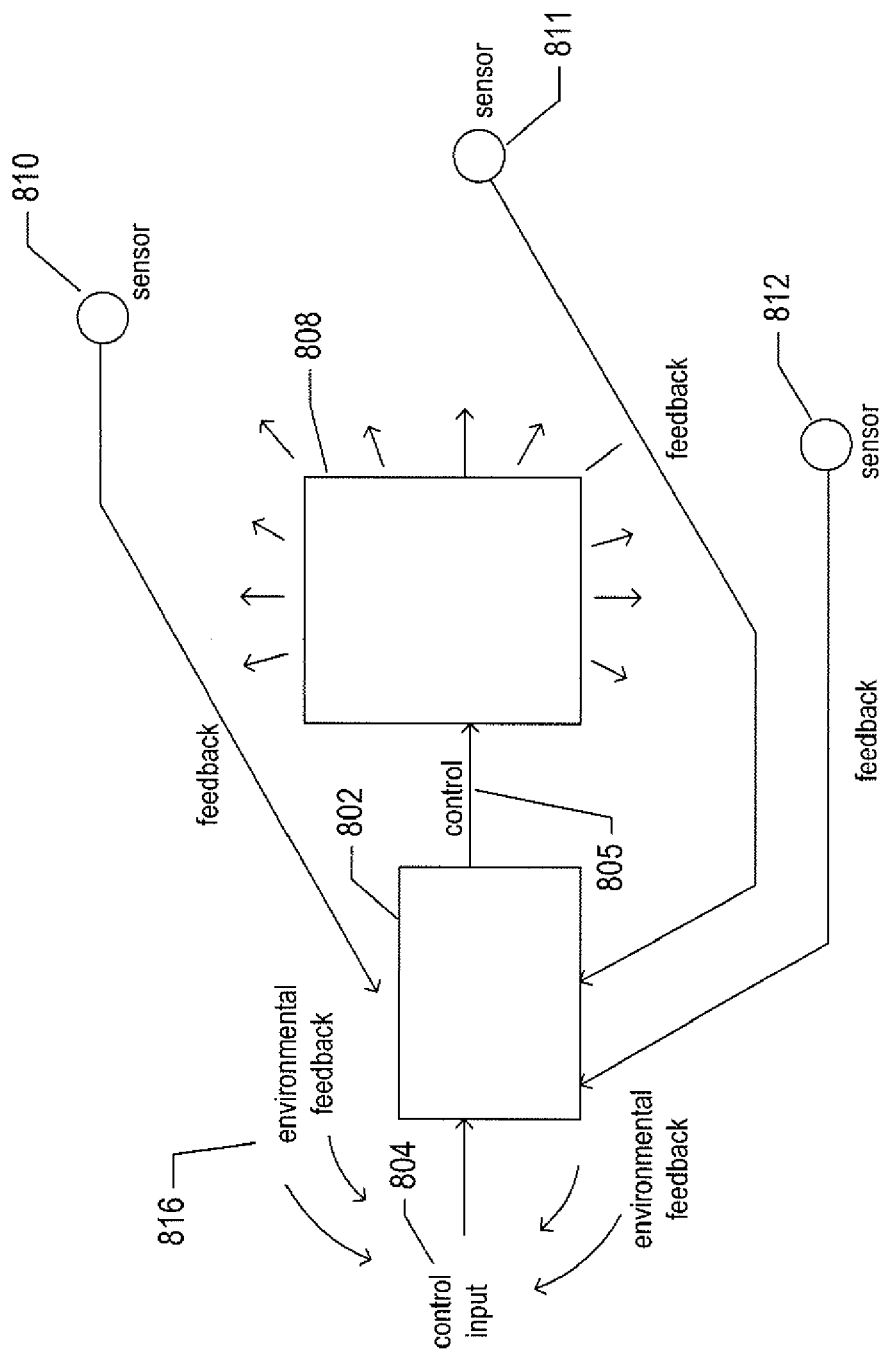
FIG. 8 illustrates a typical control environment within which an intelligent controller operates.

FIG. 8 illustrates a typical control environment within which an intelligent controller operates. As discussed above, an intelligent controller 802 receives control inputs from users or other entities 804 and uses the control inputs, along with stored control schedules and other information, to generate output control signals 805 that control operation of one or more controlled entities 808. Operation of the controlled entities may alter an environment within which sensors 810-812 are embedded. The sensors return sensor output, or feedback, to the intelligent controller 802. Based on this feedback, the intelligent controller modifies the output control signals in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 816 to users which, in turn, elicits subsequent user control and scheduling inputs to the intelligent controller 802. In other words, users can either be viewed as another type of sensor that outputs immediate-control directives and control-schedule changes, rather than raw sensor output, or can be viewed as a component of a higher-level feedback loop.

Figure 9:
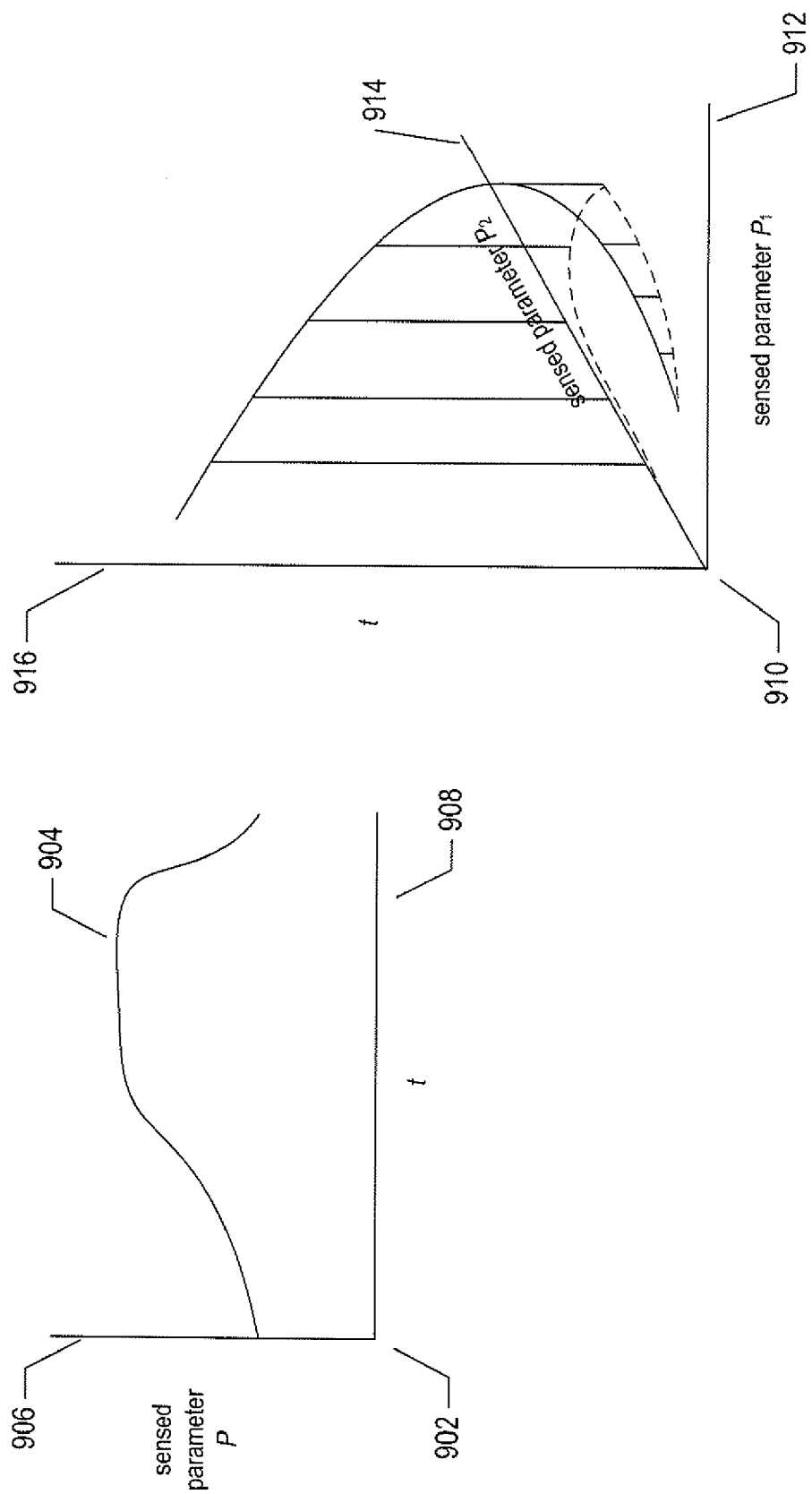
FIG. 9 illustrates the general characteristics of sensor output.

There are many different types of sensors and sensor output. In general, sensor output is directly or indirectly related to some type of parameter, machine state, organization state, computational state, or physical environmental parameter. FIG. 9 illustrates the general characteristics of sensor output. As shown in a first plot 902 in FIG. 9, a sensor may output a signal, represented by curve 904, over time, with the signal directly or indirectly related to a parameter P, plotted with respect to the vertical axis 906. The sensor may output a signal continuously or at intervals, with the time of output plotted with respect to the horizontal axis 908. In certain cases, sensor output may be related to two or more parameters. For example, in plot 910, a sensor outputs values directly or indirectly related to two different parameters $P_1$ and $P_2$, plotted with respect to axes 912 and 914, respectively, over time, plotted with respect to vertical axis 916. In the following discussion, for simplicity of illustration and discussion, it is assumed that sensors produce output directly or indirectly related to a single parameter, as in plot 902 in FIG. 9. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 10A:
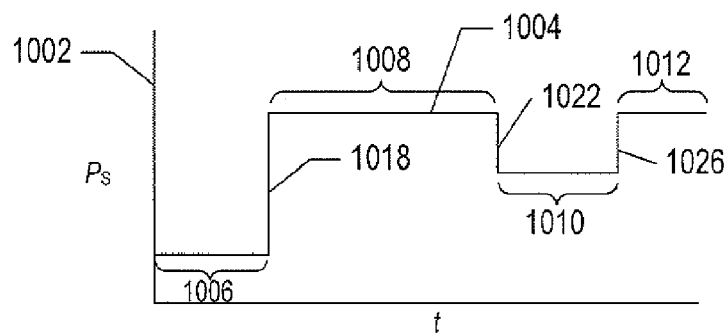
FIGS. 10A-D illustrate information processed and generated by an intelligent controller during control operations.

FIGS. 10A-D illustrate information processed and generated by an intelligent controller during control operations. All the figures show plots, similar to plot 902 in FIG. 9, in which values of a parameter or another set of control-related values are plotted with respect to a vertical axis and time is plotted with respect to a horizontal axis. FIG. 10A shows an idealized specification for the results of controlled-entity operation. The vertical axis 1002 in FIG. 10A represents a specified parameter value, $P_S$. For example, in the case of an intelligent thermostat, the specified parameter value may be temperature. For an irrigation system, by contrast, the specified parameter value may be flow rate. FIG. 10A is the plot of a continuous curve 1004 that represents desired parameter values, over time, that an intelligent controller is directed to achieve through control of one or more devices, machines, or systems. The specification indicates that the parameter value is desired to be initially low 1006, then rise to a relatively high value 1008, then subside to an intermediate value 1010, and then again rise to a higher value 1012. A control specification can be visually displayed to a user, as one example, as a control schedule.

Figure 10B:
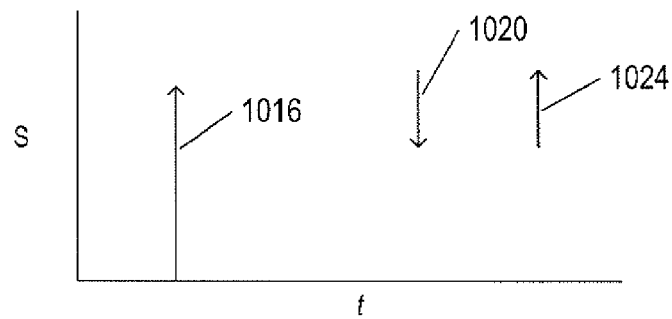

FIG. 10B shows an alternate view, or an encoded-data view, of a control schedule corresponding to the control specification illustrated in FIG. 10A. The control schedule includes indications of a parameter-value increase 1016 corresponding to edge 1018 in FIG. 10A, a parameter-value decrease 1020 corresponding to edge 1022 in FIG. 10A, and a parameter-value increase 1024 corresponding to edge 1016 in FIG. 10A. The directional arrows plotted in FIG. 10B can be considered to be setpoints, or indications of desired parameter changes at particular points in time within some period of time.

A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 10C:
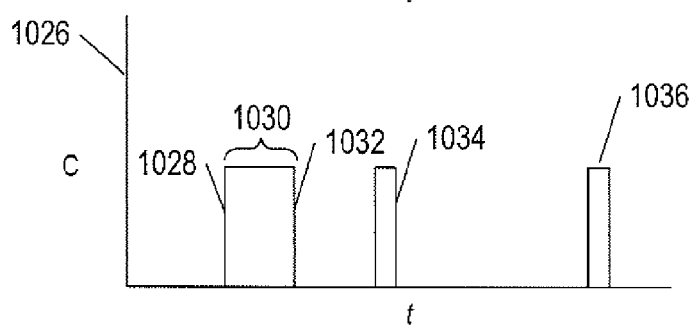

FIG. 10C illustrates the control output by an intelligent controller that might result from the control schedule illustrated in FIG. 10B. In this figure, the magnitude of an output control signal is plotted with respect to the vertical axis 1026. For example, the control output may be a voltage signal output by an intelligent thermostat to a heating unit, with a high-voltage signal indicating that the heating unit should be currently operating and a low-voltage output indicating that the heating system should not be operating. Edge 1028 in FIG. 10C corresponds to setpoint 1016 in FIG. 10B. The width of the positive control output 1030 may be related to the length, or magnitude, of the desired parameter-value change, indicated by the length of setpoint arrow 1016. When the desired parameter value is obtained, the intelligent controller discontinues output of a high-voltage signal, as represented by edge 1032. Similar positive output control signals 1034 and 1036 are elicited by setpoints 1020 and 1024 in FIG. 10B.

Figure 10D:
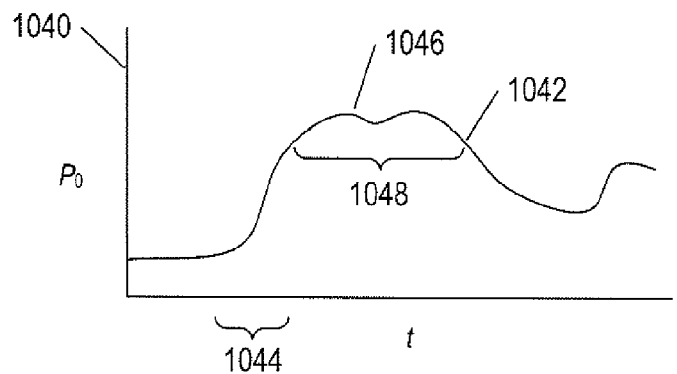

Finally, FIG. 10D illustrates the observed parameter changes, as indicated by sensor output, resulting from control, by the intelligent controller, of one or more controlled entities. In FIG. 10D, the sensor output, directly or indirectly related to the parameter P, is plotted with respect to the vertical axis 1040. The observed parameter value is represented by a smooth, continuous curve 1042. Although this continuous curve can be seen to be related to the initial specification curve, plotted in FIG. 10A, the observed curve does not exactly match that specification curve. First, it may take a finite period of time 1044 for the controlled entity to achieve the parameter-valued change represented by setpoint 1016 in the control schedule plotted in FIG. 10B. Also, once the parameter value is obtained, and the controlled entity directed to discontinue operation, the parameter value may begin to fall 1046, resulting in a feedback-initiated control output to resume operation of the controlled entity in order to maintain the desired parameter value. Thus, the desired high-level constant parameter value 1008 in FIG. 10A may, in actuality, end up as a time-varying curve 1048 that does not exactly correspond to the control specification 1004. The first level of feedback, discussed above with reference to FIG. 8, is used by the intelligent controller to control one or more control entities so that the observed parameter value, over time, as illustrated in FIG. 10D, matches the specified time behavior of the parameter in FIG. 10A as closely as possible. The second level feedback control loop, discussed above with reference to FIG. 8, may involve alteration of the specification, illustrated in FIG. 10A, by a user, over time, either by changes to stored control schedules or by input of immediate-control directives, in order to generate a modified specification that produces a parameter-value/time curve reflective of a user's desired operational results.

Figure 11A:
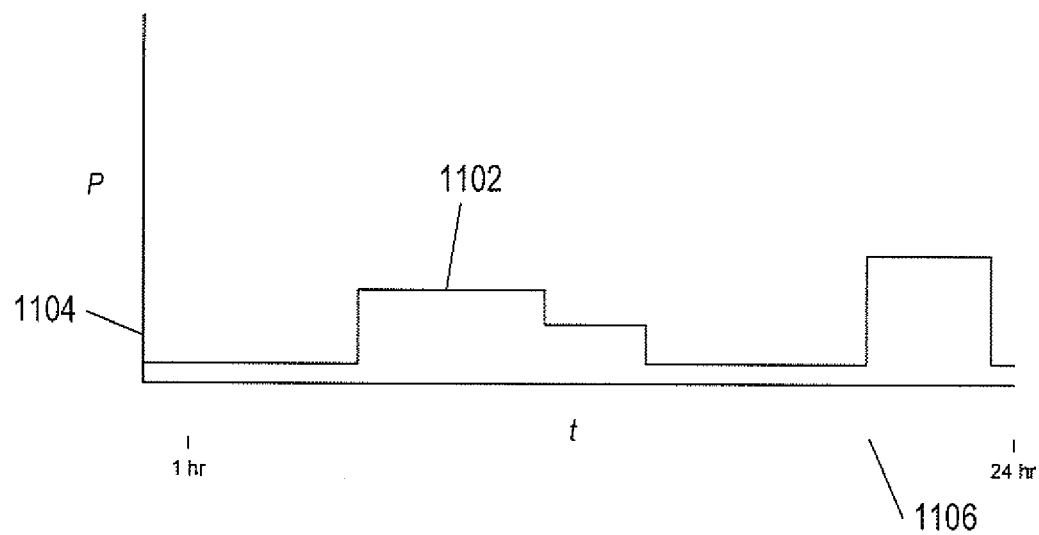
FIGS. 11A-C show three different types of control schedules.
Figure 11B:
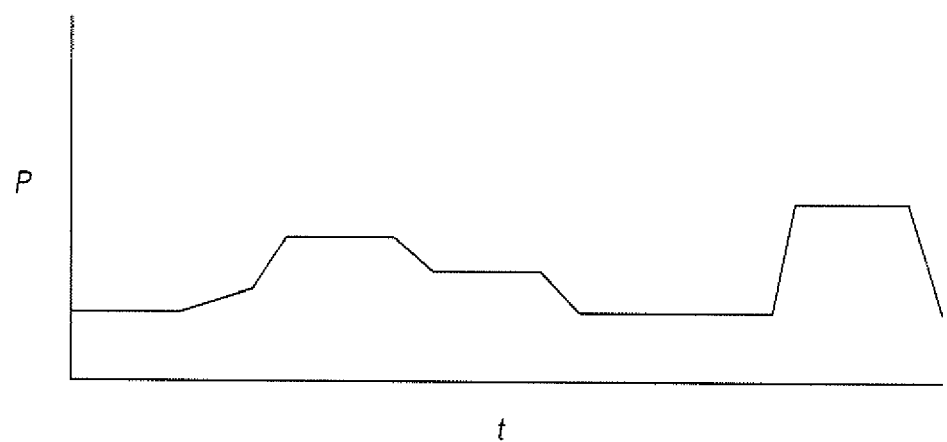
Figure 11C:
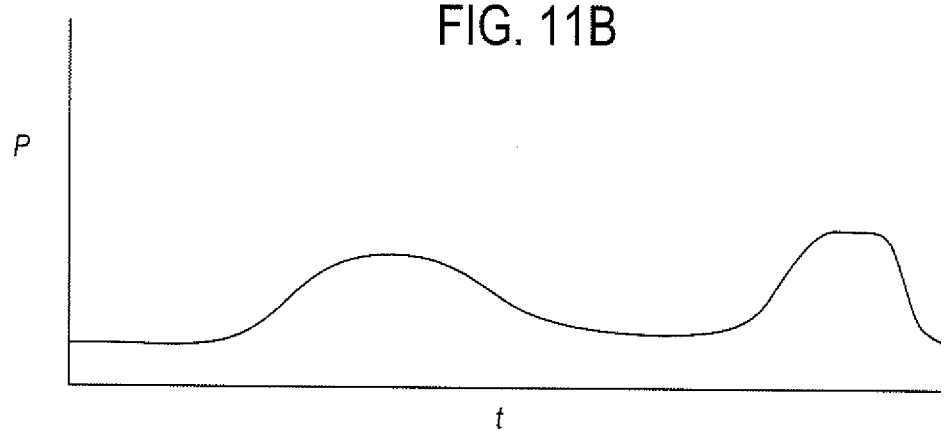

FIGS. 11A-C show three different types of control schedules. In FIG. 11A, the control schedule is a continuous curve 1102 representing a parameter value, plotted with respect to the vertical axis 1104, as a function of time, plotted with respect to the horizontal axis 1106. The continuous curve comprises only horizontal and vertical sections. Horizontal sections represent periods of time at which the parameter is desired to remain constant and vertical sections represent desired changes in the parameter value at particular points in time. This is a simple type of control schedule and is used, below, in various examples of automated control-schedule learning. However, automated control-schedule-learning methods can also learn more complex types of schedules. For example, FIG. 11B shows a control schedule that includes not only horizontal and vertical segments, but arbitrarily angled straight-line segments. Thus, a change in the parameter value may be specified, by such a control schedule, to occur at a given rate, rather than specified to occur instantaneously, as in the simple control schedule shown in FIG. 11A. Automated-control-schedule-learning methods may also accommodate smooth-continuous-curve-based control schedules, such as that shown in FIG. 11C. In general, the characterization and data encoding of smooth, continuous-curve-based control schedules, such as that shown in FIG. 11C, is more complex and includes a greater amount of stored data than the simpler control schedules shown in FIGS. 11B and 11A.

In the following discussion, it is generally assumed that a parameter value tends to relax towards lower values in the absence of system operation, such as when the parameter value is temperature and the controlled system is a heating unit. However, in other cases, the parameter value may relax toward higher values in the absence of system operation, such as when the parameter value is temperature and the controlled system is an air conditioner. The direction of relaxation often corresponds to the direction of lower resource or expenditure by the system. In still other cases, the direction of relaxation may depend on the environment or other external conditions, such as when the parameter value is temperature and the controlled system is an HVAC system including both heating and cooling functionality.

Turning to the control schedule shown in FIG. 11A, the continuous-curve-represented control schedule 1102 may be alternatively encoded as discrete setpoints corresponding to vertical segments, or edges, in the continuous curve. A continuous-curve control schedule is generally used, in the following discussion, to represent a stored control schedule either created by a user or remote entity via a schedule-creation interface provided by the intelligent controller or created by the intelligent controller based on already-existing control schedules, recorded immediate-control inputs, and/or recorded sensor data, or a combination of these types of information.

Figure 12A:
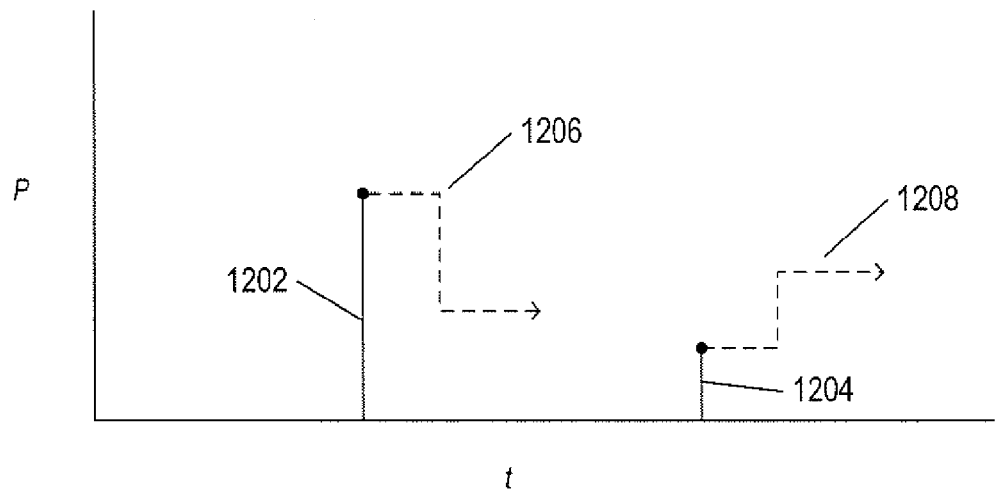
FIGS. 12A-G show representations of immediate-control inputs that may be received and executed by an intelligent controller, and then recorded and overlaid onto control schedules, such as those discussed above with reference to FIGS. 11A-C, as part of automated control-schedule learning.

Immediate-control inputs are also graphically represented in parameter-value versus time plots. FIGS. 12A-G show representations of immediate-control inputs that may be received and executed by an intelligent controller, and then recorded and overlaid onto control schedules, such as those discussed above with reference to FIGS. 11A-C, as part of automated control-schedule learning. An immediate-control input is represented graphically by a vertical line segment that ends in a small filled or shaded disk. FIG. 12A shows representations of two immediate-control inputs 1202 and 1204. An immediate-control input is essentially equivalent to an edge in a control schedule, such as that shown in FIG. 11A, that is input to an intelligent controller by a user or remote entity with the expectation that the input control will be immediately carried out by the intelligent controller, overriding any current control schedule specifying intelligent-controller operation. An immediate-control input is therefore a real-time setpoint input through a control-input interface to the intelligent controller.

Because an immediate-control input alters the current control schedule, an immediate-control input is generally associated with a subsequent, temporary control schedule, shown in FIG. 12A as dashed horizontal and vertical lines that form a temporary-control-schedule parameter vs. time curve extending forward in time from the immediate-control input. Temporary control schedules 1206 and 1208 are associated with immediate-control inputs 1202 and 1204, respectively, in FIG. 12A.

Figure 12B:
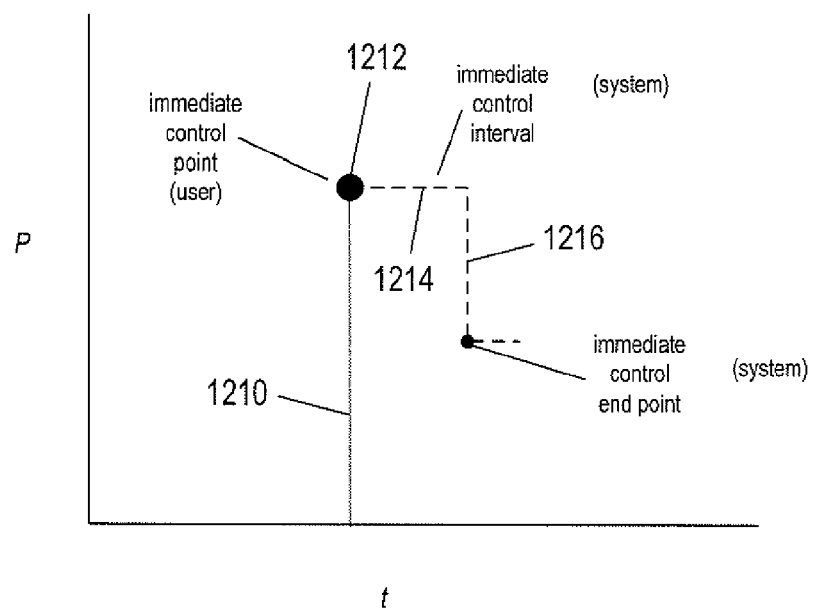

FIG. 12B illustrates an example of immediate-control input and associated temporary control schedule. The immediate-control input 1210 is essentially an input setpoint that overrides the current control schedule and directs the intelligent controller to control one or more controlled entities in order to achieve a parameter value equal to the vertical coordinate of the filled disk 1212 in the representation of the immediate-control input. Following the immediate-control input, a temporary constant-temperature control-schedule interval 1214 extends for a period of time following the immediate-control input, and the immediate-control input is then relaxed by a subsequent immediate-control-input endpoint, or subsequent setpoint 1216. The length of time for which the immediate-control input is maintained, in interval 1214, is a parameter of automated control-schedule learning. The direction and magnitude of the subsequent immediate-control-input endpoint setpoint 1216 represents one or more additional automated-control-schedule-learning parameters. Please note that an automated-control-schedule-learning parameter is an adjustable parameter that controls operation of automated control-schedule learning, and is different from the one or more parameter values plotted with respect to time that comprise control schedules. The parameter values plotted with respect to the vertical axis in the example control schedules to which the current discussion refers are related directly or indirectly to observables, including environmental conditions, machines states, and the like.

Figure 12C:
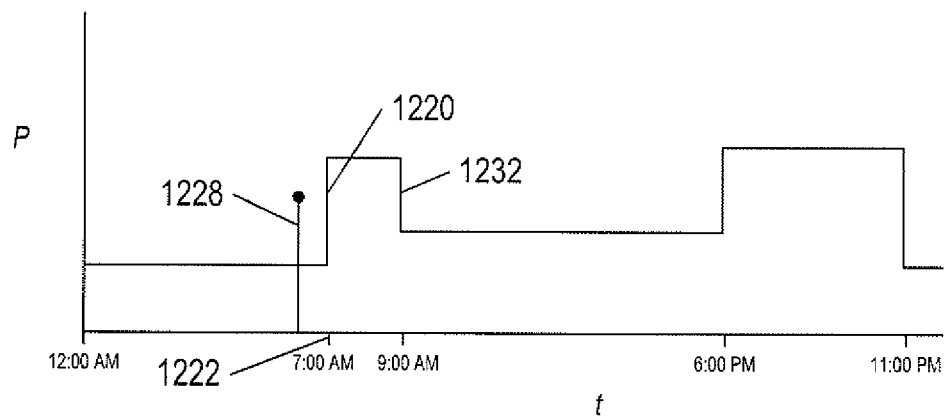
Figure 12D:
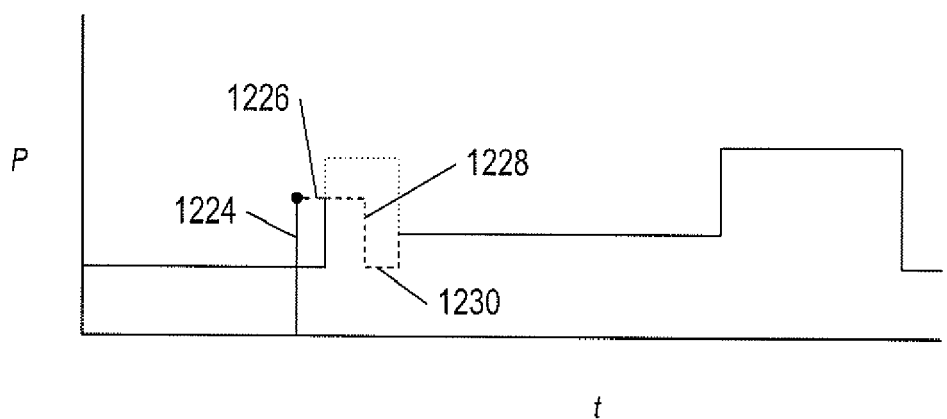

FIG. 12C shows an existing control schedule on which an immediate-control input is superimposed. The existing control schedule called for an increase in the parameter value P, represented by edge 1220, at 7:00 a.m. (1222 in FIG. 12C). The immediate-control input 1224 specifies an earlier parameter-value change of somewhat less magnitude. FIGS. 12D-G illustrate various subsequent temporary control schedules that may obtain, depending on various different implementations of intelligent-controller logic and/or current values of automated-control-schedule-learning parameter values. In FIGS. 12D-G, the temporary control schedule associated with an immediate-control input is shown with dashed line segments and that portion of the existing control schedule overridden by the immediate-control input is shown by dotted line segments. In one approach, shown in FIG. 12D, the desired parameter value indicated by the immediate-control input 1224 is maintained for a fixed period of time 1226 after which the temporary control schedule relaxes, as represented by edge 1228, to the parameter value that was specified by the control schedule at the point in time that the immediate-control input is carried out. This parameter value is maintained 1230 until the next scheduled setpoint, which corresponds to edge 1232 in FIG. 12C, at which point the intelligent controller resumes control according to the control schedule.

Figure 12E:
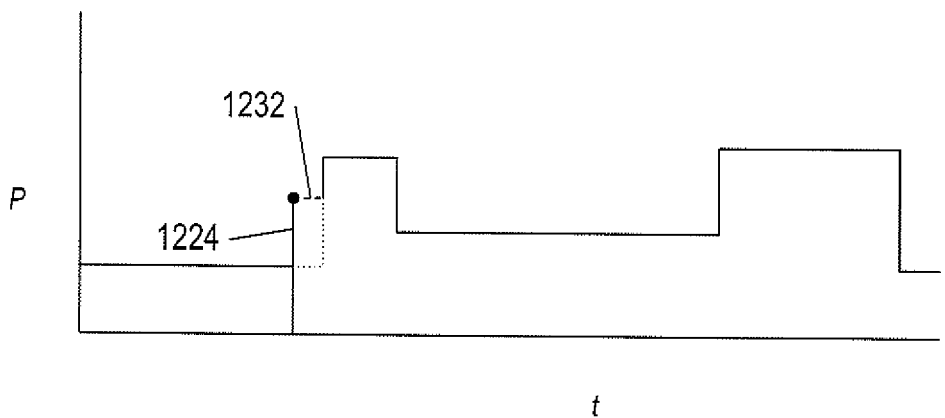

In an alternative approach shown in FIG. 12E, the parameter value specified by the immediate-control input 1224 is maintained 1232 until a next scheduled setpoint is reached, in this case the setpoint corresponding to edge 1220 in the control schedule shown in FIG. 12C. At the next setpoint, the intelligent controller resumes control according to the existing control schedule. This approach is desired by certain users, who expect manually entered setpoint to remain in force until a next scheduled setpoint change.

Figure 12F:
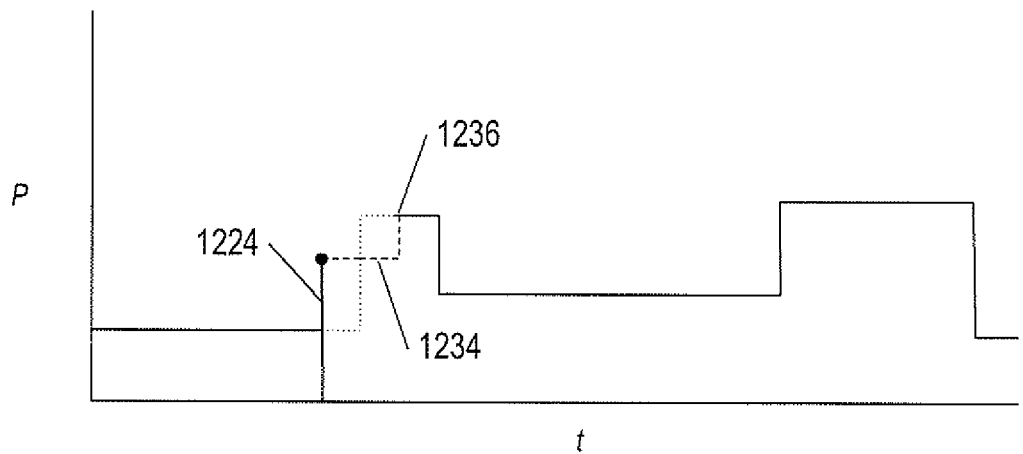

In a different approach, shown in FIG. 12F, the parameter value specified by the immediate-control input 1224 is maintained by the intelligent controller for a fixed period of time 1234, following which the parameter value that would have been specified by the existing control schedule at that point in time is resumed 1236.

Figure 12G:
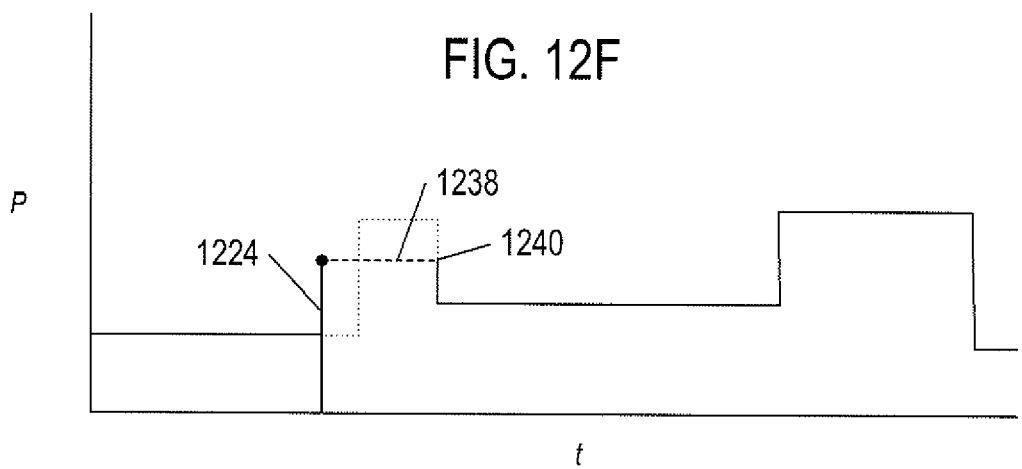

In the approach shown in FIG. 12G, the parameter value specified by the immediate-control input 1224 is maintained 1238 until a setpoint with opposite direction from the immediate-control input is reached, at which the existing control schedule is resumed 1240. In still alternative approaches, the immediate-control input may be relaxed further, to a lowest-reasonable level, in order to attempt to optimize system operation with respect to resource and/or energy expenditure. In these approaches, generally used during aggressive learning, a user is compelled to positively select parameter values greater than, or less than, a parameter value associated with a minimal or low rate of energy or resource usage.

In one example implementation of automated control-schedule learning, an intelligent controller monitors immediate-control inputs and schedule changes over the course of a monitoring period, generally coinciding with the time span of a control schedule or subschedule, while controlling one or more entities according to an existing control schedule except as overridden by immediate-control inputs and input schedule changes. At the end of the monitoring period, the recorded data is superimposed over the existing control schedule and a new provisional schedule is generated by combining features of the existing control schedule and schedule changes and immediate-control inputs. Following various types of resolution, the new provisional schedule is promoted to the existing control schedule for future time intervals for which the existing control schedule is intended to control system operation.

Figure 13A:
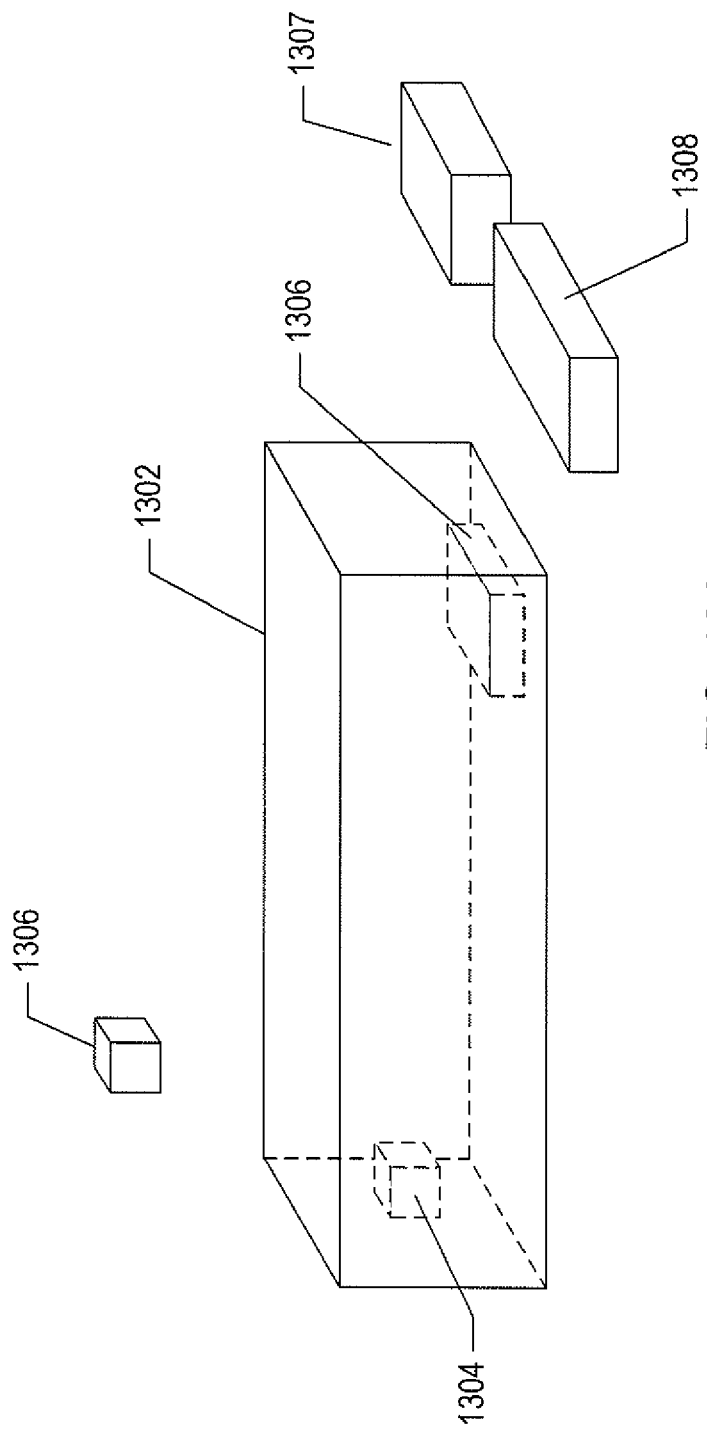

FIGS. 13A-D illustrate the general context in which intelligent controllers, to which the current application is directed, operate. As shown in FIG. 13A, this context comprises a region or volume 1302, one or more intelligent controllers 1304 and 1306, and one or more devices, systems, or other entities 1306-1308 that are controlled by the one or more intelligent controllers and that operate on the region or volume 1302. In many cases, the intelligent controllers are described as controlling the region or volume 1302 although, in fact, they directly control the one or more devices, systems, or other entities 1306-1308. The region or volume 1302 may be a complex region or volume that includes multiple connected or separate subregions or subvolumes. The region, regions, volume, or volumes controlled by an intelligent controller is referred to, below, as the "controlled environment." The intelligent controllers may reside within the environment, as intelligent controller 1304 shown in FIG. 13A, or may reside externally, as, for example, intelligent controller 1306 in FIG. 13A. Similarly, the devices, systems, or other entities that operate on the environment 1306-1308 may reside within the environment, as, for example, system 1306 in FIG. 13A, or may be located outside of the environment, as, for example, systems 1307-1308 in FIG. 13A. In a specific example discussed in a following subsection, the systems are HVAC systems and/or additional air conditioners and heaters and the intelligent controllers are intelligent thermostats, with the environment a residence, multi-family dwelling, commercial building, or industrial building that is heated, cooled, and/or ventilated by the systems controlled by the intelligent thermostats.

Figure 13B:
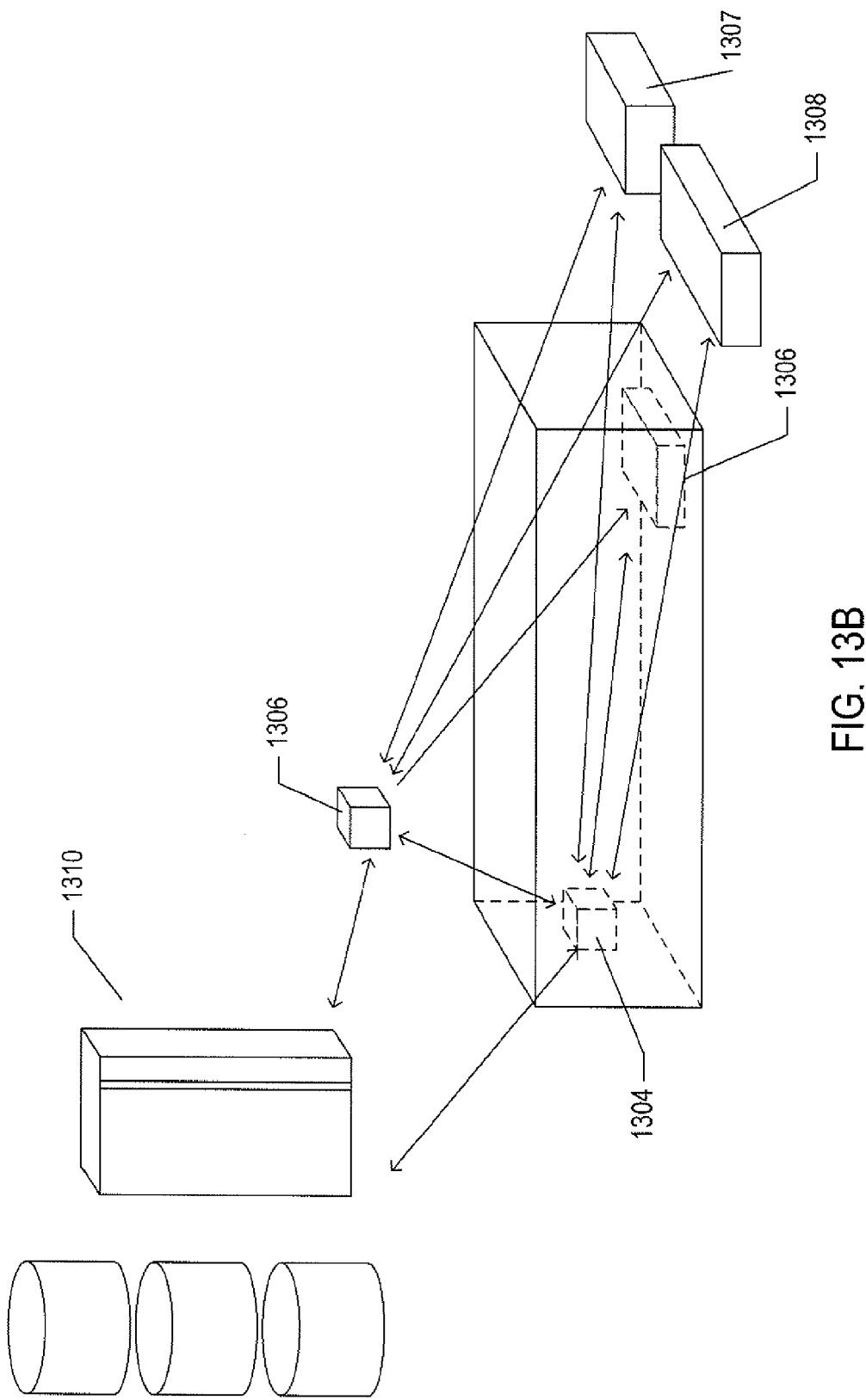
Figure 13C:
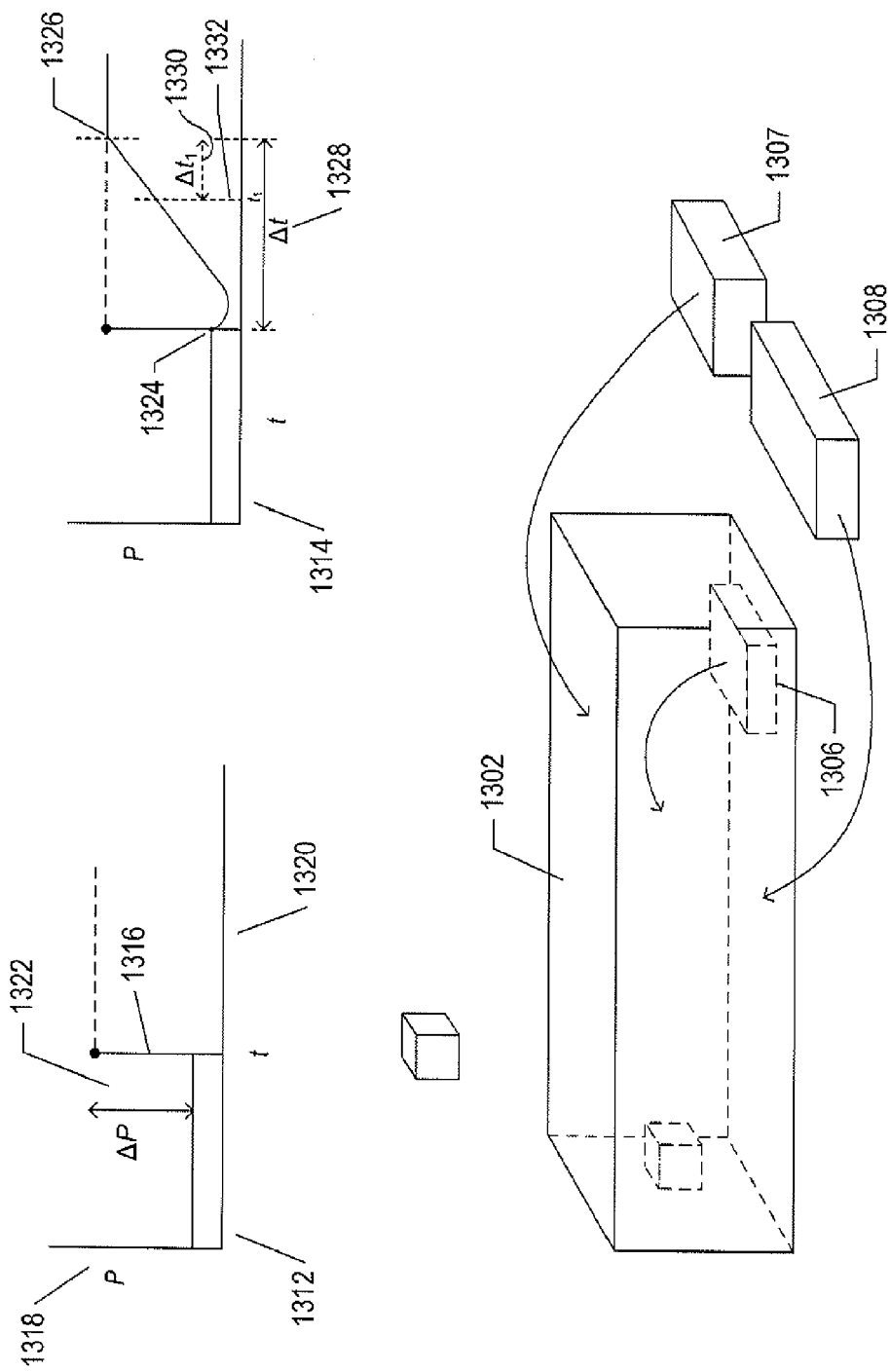

As shown in FIG. 13B, the intelligent controllers 1304 and 1306 generally intercommunicate with one another and may additionally intercommunicate with a remote computing system 1310 to which certain of control tasks and intelligent-control-related computations are distributed. In addition, the intelligent controllers generally output control signals to, and receive data signals from, the systems 1306-1308 controlled by the intelligent controllers. As shown in FIG. 13C, the systems 1306-1308 are controlled by the intelligent controllers to operate on the environment 1302. This operation may involve exchange of various types of substances, operations that result in heat exchange with the environment, exchange of electrical current with the environment, and many other types of operations. These operations generally affect one or more characteristics or parameters of the environment which are directly or indirectly monitored by the intelligent controllers. The intelligent controllers, to which the current application is directed, generally control the environment based on control schedules and immediate-control inputs that can be thought of as overlaid on or added to the control schedules. The context within which the general class of intelligent controllers operates is illustrated, in FIG. 13C, with two plots 1312 and 1314. The first plot 1312 is a portion of a control schedule to which an immediate-control input 1316 has been added. Alternatively, the portion of the control schedule may feature a scheduled setpoint rather than the immediate-control input 1316. The vertical axis is labeled "P" 1318 to represent the value of a particular parameter or characteristic of the environment, referred to as an "environmental parameter," and the horizontal axis represents time 1320. The immediate-control input 1316 or, alternatively, a scheduled setpoint, generally represent a desired change in the parameter or characteristic 1322, designated $\Delta P$. At the time of the immediate-control input, or before or at the time of a scheduled input, the intelligent controller generally outputs control signals to the systems in order to change the parameter or characteristic P by $\Delta P$. It should be noted that, although in the current example $\Delta P$ is positive, with the desired parameter P greater than the current value of the parameter P, the $\Delta P$ may also be negative, with the desired value of P less than the current P. It may also be the case that intelligent controllers control the systems with respect to multiple parameters, in which case there may be separate control schedules for each parameter, and multiple parameters may be combined together to form a composite parameter for a single control schedule. Alternatively, setpoints may be associated with multiple P values for each of one or more environmental parameters. In the following discussion, for simplicity of illustration and discussion, it is assumed that a single parameter P is monitored by the one or more intelligent controllers, each setpoint specifies a single parameter value, and that intelligent controllers output control signals to one or more systems in order to control the value of the parameter P within the controlled environment 1302.

As shown in plot 1314, once intelligent controllers initiate system operation in order to change the value of the parameter P by $\Delta P$, the parameter P changes, over time, in a continuous manner from the initial P value 1324 to the desired P value 1326. In other words, the P values cannot be instantaneously altered at times corresponding to immediate-control inputs or scheduled setpoints. As a result, there is a time interval $\Delta t$ 1328, referred to as the "response time," that separates the time of an immediate-control input or scheduled setpoint change in the time which the parameter value specified by the setpoint change or immediate-control input is achieved. Intelligent controllers to which the current application is directed model the P versus t behavior within this response-time $\Delta t$ interval 1328 so that, at any point in time during the response time, the time remaining to a point in time the desired t value is obtained, or, in other words, the remaining response time, can be displayed or reported. Thus, for example, at time $t_1$ 1330, the intelligent controller calculates the length of time interval $\Delta t_1$ 1332, the remaining response time, and reports the length of this time interval in a textural, graphical, or numeric display output on an intelligent-controller display device, such as display device 410 in FIG. 4, or outputs the information through a remote-display interface for display on a remote display device, such as a smart phone. The information may include a remaining-response-time indication, an indication of the remaining response time relative to the entire response time, information including the response time so far elapsed, and other response-time related information. It should be noted that calculation of the time remaining before a desired P value is achieved may be used independently, for various different intelligent-controller operations, from the display of the remaining response time. For example, intelligent controllers may alter control strategies depending on the remaining response time computed for various different control strategies.

At first impression, the task of computing the remaining response time may appear relatively simple. However, as shown in FIG. 13D, the task is often far from simple. FIG. 13D shows various different conditions and effects that may alter the P versus t behavior of a controlled environment. In many cases, the time of day, weather, and time of year 1340 may alter the P versus t behavior of the environment, referred to below as the environment's P response. The P response may also be altered by different types of inputs 1342-1344 to the systems or internal states of the systems. For example, a system that requires electricity for operation may be inoperable during power failures, as a result of which the P response during power failures may be substantially different than the P response when power is available. The P response may also be affected by external entities other than the systems 1346 which operate on the environment or by internal systems and devices other than systems 1306-1308 that operate on the environment 1348. In addition, changes to buildings or structures, such as opened windows 1350 may significantly alter the P response to the environment due to a thermal or material exchange 1352. These are but a few of the many different possible factors that may change the P response of the environment, and thus complicate and frustrate remaining-response-time calculations and displays carried out by intelligent controllers.

Figure 14A:
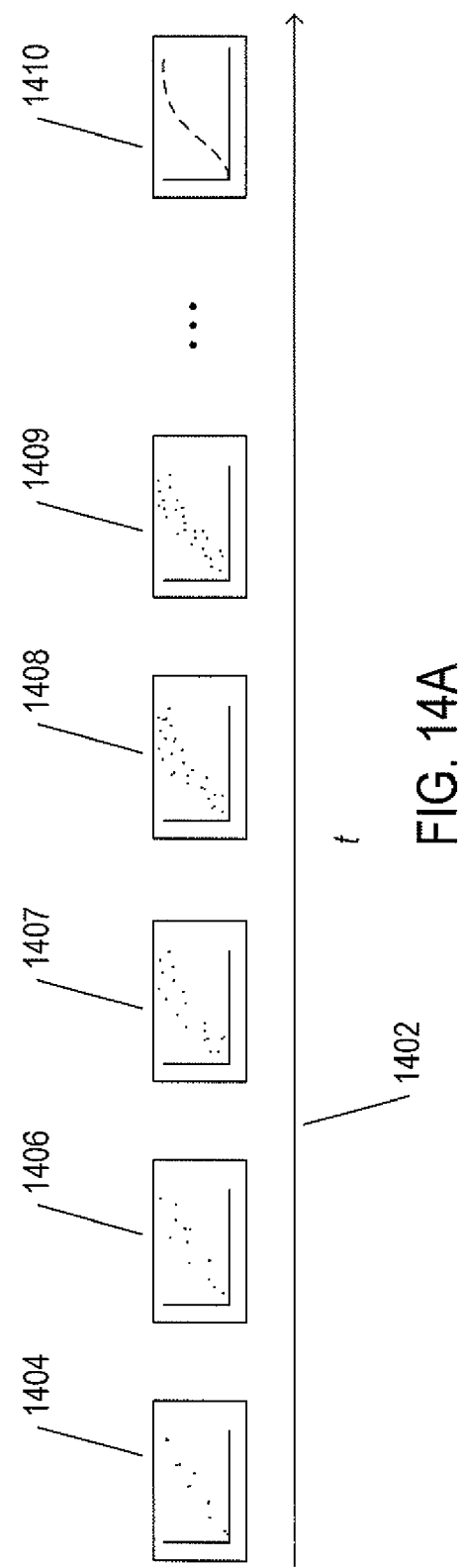
FIGS. 14A-E illustrate construction of one or more of a first type of P-response model based on observed P-response data.

In many implementations of the intelligent controllers to which the current application is directed, as a result of the many factors that may impact a particular P response for a controlled environment, the intelligent controller or controllers uses at least two different models for the P response during the response time in order to compute and display remaining response times. FIGS. 14A-E illustrate construction of one or more of a first type of P-response model based on observed P-response data. FIG. 14A shows a collection of data by an intelligent controller and construction of a parameterized P-response curve from the data. In FIG. 14A, the horizontal axis 1402 is a time axis with respect to which various data states are shown. During the response time after an immediate-control input or scheduled setpoint, such as interval $\Delta t$ 1328 in FIG. 13C, the intelligent controller monitors the change in P value in time and plots points to represent an observed P-response curve. In FIG. 14A, the first such plot 1404 represents the points plotted with respect to a first observed P-response curve of the intelligent controller. In general, the points are stored in a file or database, often as encoded coordinate pairs, rather than plotted in a graphical plot. However, for ease of description and illustration, the stored data is referred to as a "plot" in the following discussion. Observation of a first P response generally produces a set of points, such as those shown plotted in plot 1404, that describe a general trend in P versus t behavior. The intelligent controller continues to make observations of P responses, over time, adding observed P versus t points to the plot, as shown by plots 1406-1409 in FIG. 14A. After some time, were the recorded P versus t points plotted visually in a graph, they would form a relatively dense cloud of points that suggest a P versus t curve that describes the P response for the control environment. When sufficient points have been stored, the intelligent controller can generate a parameterized model, or function, that statistically best fits the collected points, as represented in FIG. 14A by parameterized plot 1410. A parameterized plot is a plot that is associated with a model that represents the observed P versus t data over the course of many P-response observations. In certain cases, the P-response data may be discarded following plot parameterization, or after passage of significant periods of time.

Figure 14B:
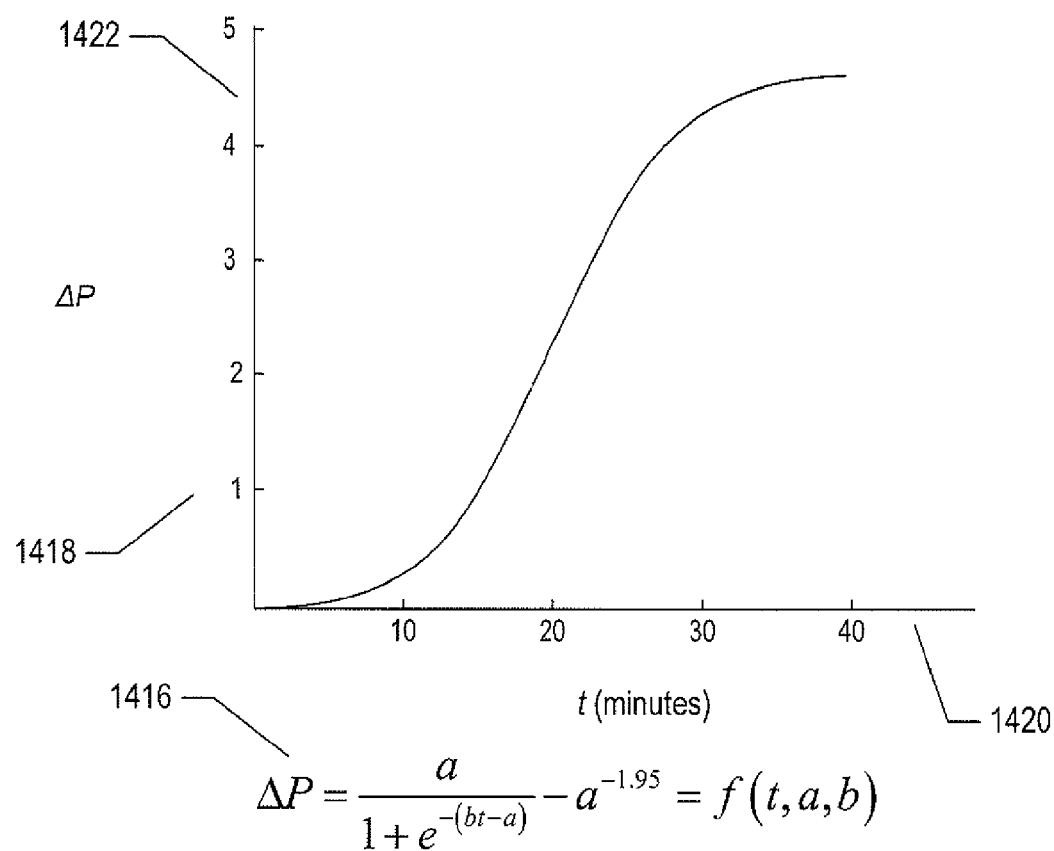

There are many possible models for P-response curves. FIG. 14B illustrates one P-response-curve model. In FIG. 14B, the expression 1416

$$\Delta P = \frac{a}{1 + e^{-(bt-a)}} - a^{-1.95} = f(t, a, b),$$

is plotted in graph 1418 with horizontal axis 1420 representing time and vertical axis 1422 representing a change in P value, $\Delta P$, starting from an initial time represented by the origin 1424. The model is non-linear between zero and about 15 minutes, is approximately linear for ten minutes, is again non-linear until about 35 minutes, and then flattens considerably thereafter. It should be noted that his model can be appropriate for certain $\Delta P$ changes and certain types of characteristics and parameters in certain environments acted on by certain types of devices and systems, but is certainly not appropriate for a large number or even a large fraction of possible controlled environments, $\Delta P$ changes, and characteristics and parameters. The expression is parameterized by two constants a and b. Thus, in general, the model computes $\Delta P$ as a function of time, the function parameterized by and one or more constant-valued parameters that are determined for a given P and a given controlled environment. In the case of the model shown in FIG. 14D, the slope of the straight-line portion of the P-response curve generated from the model can be varied by varying the value of parameter b, while the range in $\Delta P$ values can be altered by changing the value of parameter a. Many other types of models can be used for P-response curves.

Figure 14C:
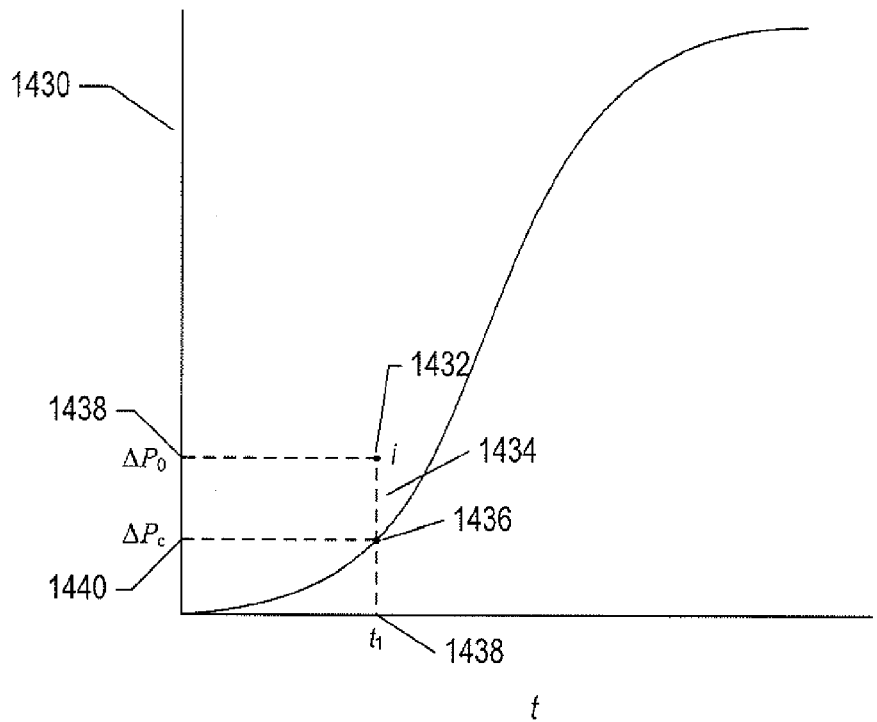
Figure 14D:
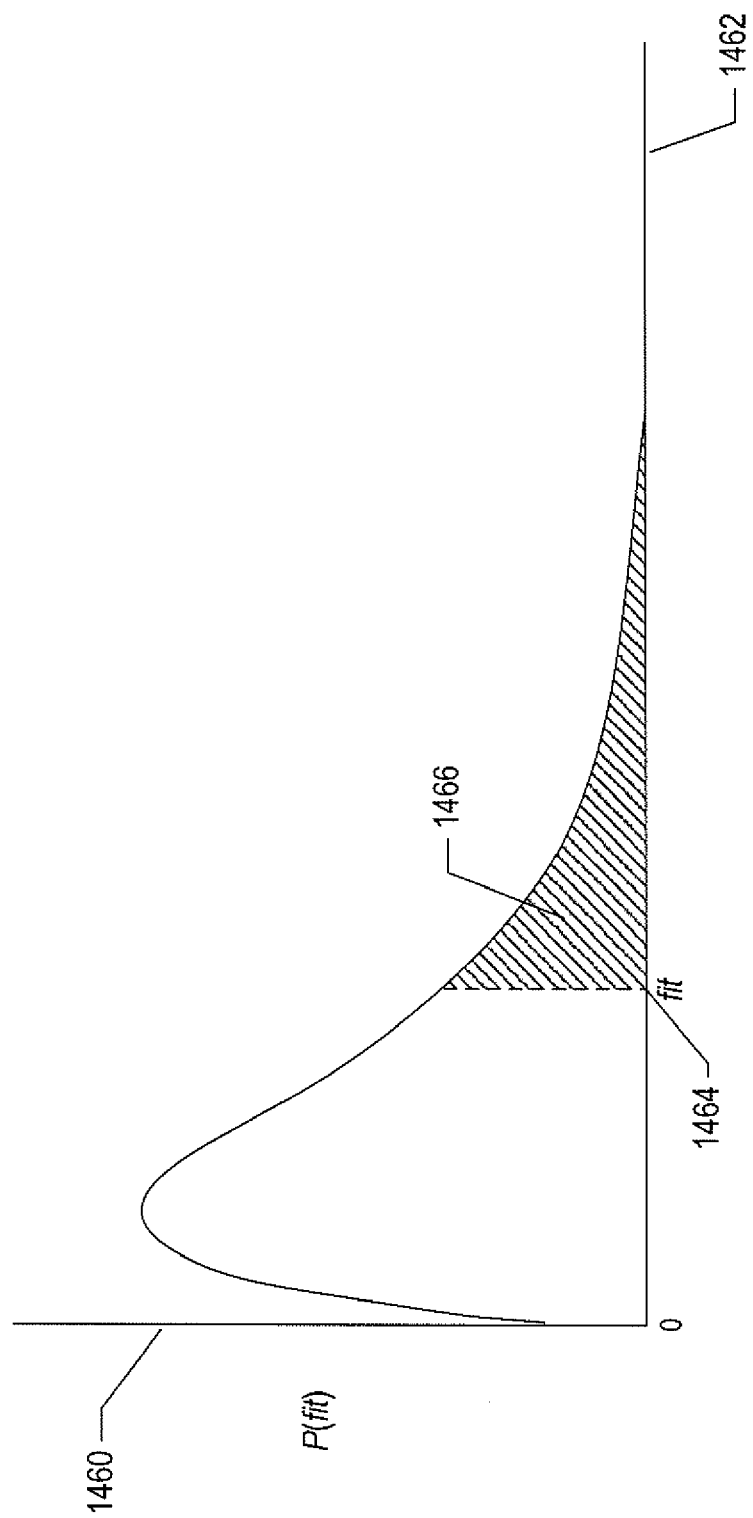

The parameterized model generated for a collection of observed P responses is generally only an estimate and, because of all the different factors that may affect P responses, the parameterized model is generally an estimate for the average P response of the controlled environment. Were the model curve to be plotted within the dense clouds of points representing the observed data, generally only a very few of the observed points would actually fall on the P-response curve generated by the model. Models are selected and evaluated by evaluating how well the data fits the model. There are many statistical methods that may be employed to compute the fit of a model to experimental data. FIGS. 14C-D illustrate one such method. FIG. 14C shows the model P response curve in a graphical plot 1430 similar to that shown in FIG. 14B along with one of the observed P versus t points 1432. A vertical line segment 1434, passing through the observed P versus t point 1432, also passes through the model curve at point 1436 and through the time axis at point 1438, the time coordinate of which is referred to as $t_1$. The $\Delta P$ coordinate 1438 of the observed P versus t point is labeled $\Delta p_o$ and the $\Delta P$ coordinate 1440 of the point on the model curve corresponding to time $t_1$ 1410 is labeled $\Delta p_c$. A discrepancy $\Delta_{o/c_i}$ between the observed data point i 1432 and corresponding model point 1436 can be computed as:

$$\Delta_{o/c_i} = \frac{(\Delta p_o - \Delta p_c)^2}{\Delta p_c}$$

A fit value for the curve with respect to the observed data can be computed by summing all of the discrepancies for all of the data points, as follows:

$$\text{fit} = \sum_{i=1}^{N} \Delta_{o/c_i}.$$

Were all of the data points to fall along the model curve, the fit value would be 0. As the observed data departs further from the model curve, the fit value increases.

As shown in FIG. 14D, it is often the case that fit values calculated from various different data sets fall into a particular type of probability distribution. One such probability distribution is shown in FIG. 14D. The vertical axis 1460 represents the probability of observing a particular fit value and the horizontal axis 1462 represents the different possible fit values. For a particular fit value, such as fit value 1464, the area under the probability-distribution curve to the right of the fit value 1466, shown cross-hatched in FIG. 14D, represents the probability of observing the fit value 1464 or a fit value greater than that fit value. This probability can also be used to evaluate the reasonableness of the model with respect to observed data. When the probability of a fit value equal to or greater than the observed fit value falls below a threshold probability, the model may be rejected.

Returning to FIG. 14A, the intelligent controller may, after observing each response and adding the data points for the observed P response to a plot, compute the fit value of various different models with respect to the data and, when one or more models is associated with a fit value less than a first threshold value or with a corresponding probability value greater than a second threshold value, the intelligent controller may select the best fitting model from the one or more models and generate a parameterized plot by associating the selected model, including selected constant values for the model parameters, with the plot. This constitutes what is referred to as "parameterizing the plot" in the following discussion. Once a plot is parameterized, the plot becomes a global model that can be used, by the intelligent controller, to predict remaining response time, or time-to, values for display and for other purposes. The parameterized plot may be continued to be refined, over time, following addition of new P-response data, including changing the global model associated with the parameterized plot and altering constant-parameter values. This refinement may continue indefinitely, or may be discontinued after a highly reliable model is constructed. Alternatively, the parameterized plot may represent a sliding data window, with only recent data used to select a current associated model and parameter values.

Figure 14E:
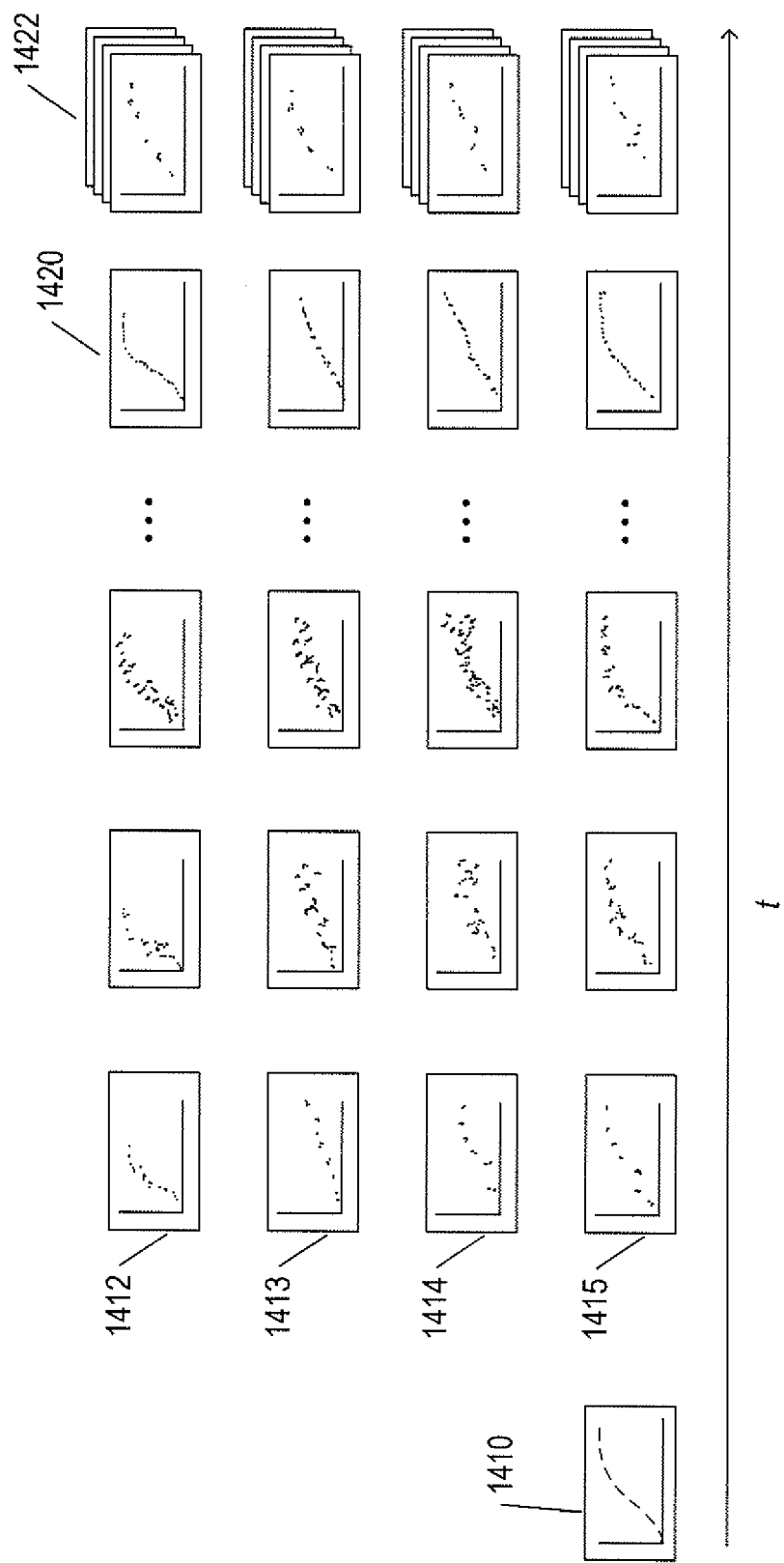

An intelligent controller may generate various different parameterized models, also referred to as "global models," for various different conditions. FIG. 14E illustrates generation of multiple global models as a continuation of the timeline shown in FIG. 14A. Once a first parameterized plot 1410 has been generated, the intelligent controller may elect to divide the collected data points among multiple plots 1412-1415 each collecting observed P responses under different conditions. For example, when it is determined that weather and outside-temperature are important influences on P responses, the intelligent controller may collect separate P-response data for sunny days, cloudy days, nighttime, days with high wind, and other such different weather conditions. FIG. 14E illustrates division of the initial plot 1410 into four plots 1412-1415 arranged along a vertical parameter or condition dimension, such as a weather-and-temperature dimension. Then, as shown in FIG. 14E, the intelligent controller may continue to collect data for each of these individual plots until they can be parameterized, with the parameterized plots shown in column 1420. At this point, the intelligent controller may then generate new plots, essentially extending the data collection along a new dimension, as represented by the column of sets of plots 1422 shown in FIG. 14E. The intermediate global models, such as global model 1410, may be retained in addition to the subsequently generated global models for particular conditions. Of course, the amount of data that may need to be collected in order to parameterize multi-dimensional plots expands exponentially, and this combinatorial effect severely constrains the number of different dimensions that an intelligent controller may consider. Nonetheless, an intelligent controller need not be constrained to generating only a single global model, but may generate multiple global models, each for a different condition or set of conditions, in order to better approximate P response curves that obtain under those conditions. In certain cases, the response model may depend on the magnitude of the $\Delta P$ represented by a scheduled setpoint change or immediate-input control.

Figure 15B:
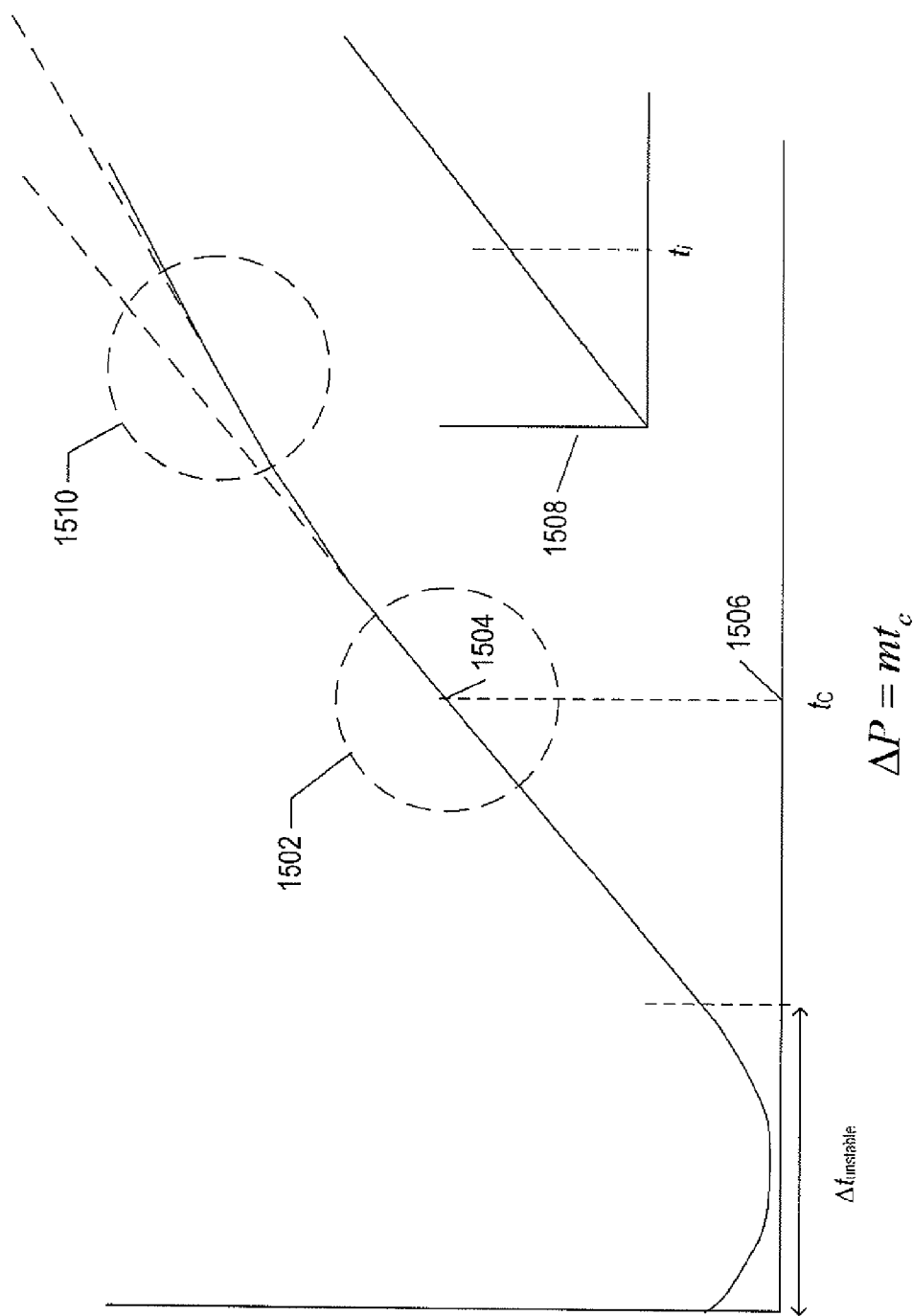

A second type of P-response model that may be employed by intelligent controllers is referred to as a "local model." Generally, regardless of how much data is collected and used to generate one or more global models, it is difficult for an intelligent controller to generate global models that are sufficiently accurate for highly accurate remaining-response-time calculations. Although this is not always the case, it is not unexpected, due to all the various different types of factors that may affect a P response, discussed above with reference to FIG. 13D. However, it is frequently possible to generate a simpler local model, during a particular response time. FIGS. 15A-B illustrate several types of local modeling techniques.

FIG. 15A illustrates one type of local model. In many cases, following output of control signals to one or more systems by an intelligent controller, there is a period of time referred to as $\Delta t_{unstable}$ 1502 during which the P value may fail to change or actually change in the direction opposite from the desired direction. After the unstable time interval 1502, the $\Delta P$ versus t response may be nearly linear 1504. This type of local model may be expressed as:

$$\Delta P = mt - mt_{unstable}$$

where m is the slope of the straight-line portion and is the single constant for the model. As shown in FIG. 15B, even when the response following the unstable period is not linear, but is instead a curve, the response may be approximated by a series of local linear models. In FIG. 15B, the portion of the P response within the dashed circle 1502 about the point 1504 with time coordinate $t_1$ 1506, considered as a local origin, is nearly linear, and can be approximated by a linear model 1508, expressed as:

$$\Delta P = mt_c.$$

Another portion of the P-response curve within dashed circle 1510 can be approximated by a different linear model with a different slope. Thus, by selecting a set of successive linear models over the interval between an immediate-control input or scheduled setpoint and the time when the desired P value is obtained, the intelligent controller can incrementally calculate accurate remaining response times.

Thus, global models and local models provide models of P responses. The global models are generally used during the initial portion of a response time following an immediate-control input or scheduled setpoint because, during this initial period of time, there is generally insufficient observed data to compute parameters for a local model and/or to select a particular local model. However, often it is the case that, following an initial period of time, when sufficient P versus t data points are available for the current P response, a local model can be selected and parameterized to provide more accurate remaining-response-time predictions up until the time that the desired P value is obtained. This is, however, not always the case. It may be the case that the global model is more predictive throughout the entire response time or that, after a local model is selected and used, the global model again, after another period of time, is again better able to predict the remaining-response-time value from a local model. In certain cases, neither global nor local models provide adequate predictive power. For this reason, many intelligent controllers of the class of intelligent controllers to which the current application is directed continuously reevaluate P-response models and attempt to select the best model for each point in time over an entire interval during which the remaining-response-time values are continuously, periodically, or intermittently calculated and displayed.

Figure 16:
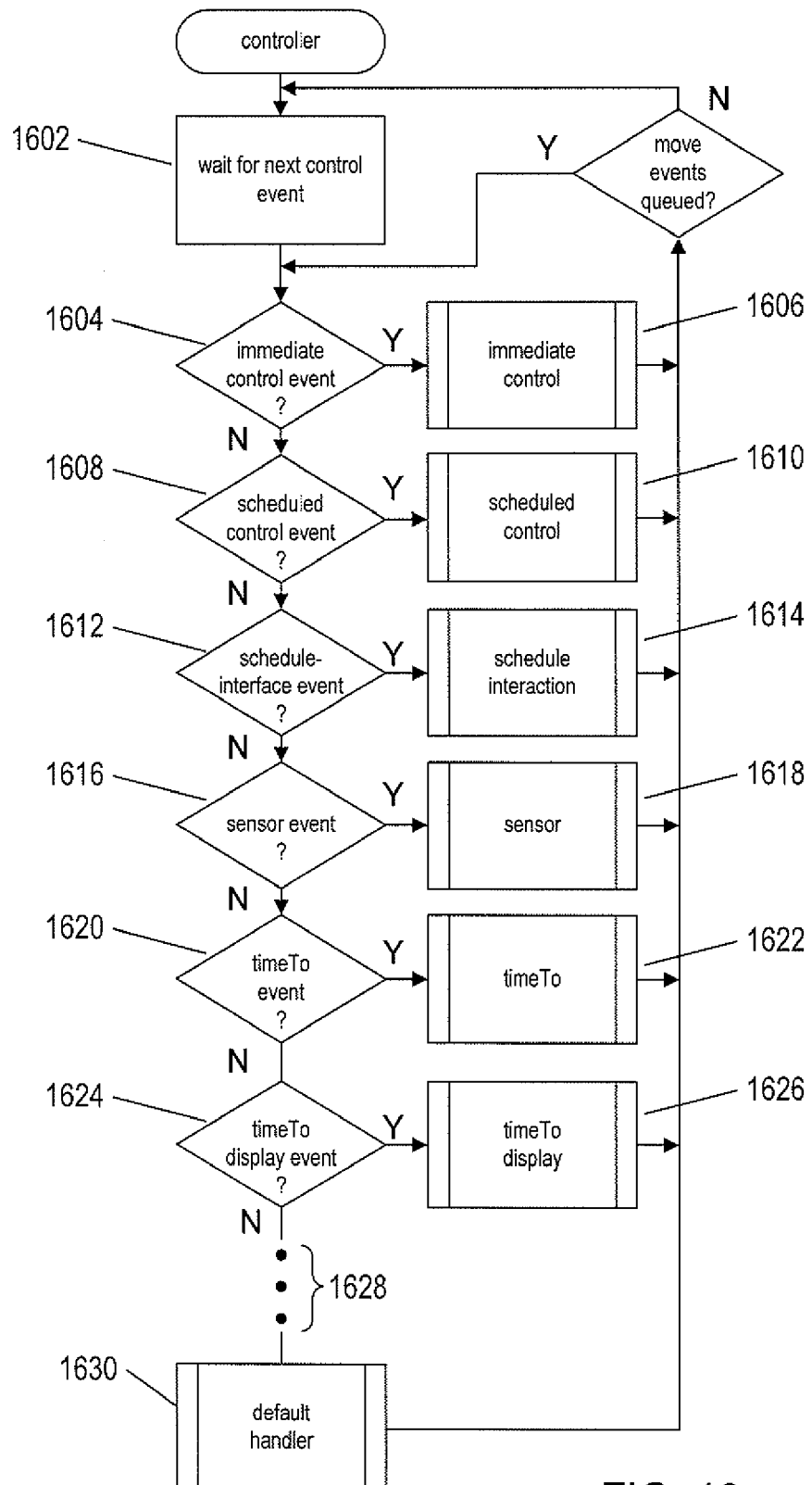
FIG. 16 illustrates a control-flow diagram for intelligent-controller operation.

FIG. 16 illustrates a control-flow diagram for intelligent-controller operation. In general, an intelligent controller, at a high level, continuously operates within the context of an event handler or event loop. In step 1602, the intelligent controller waits for a next control event. When the next control event occurs, then, in a series of conditional statements, the intelligent controller determines the type of event and invokes a corresponding control routine. In the case of an immediate-control event, as determined in step 1604, the intelligent controller calls an immediate-control routine, in step 1606, to carry out the intelligent controller's portion of a user interaction to receive one or more immediate-control inputs that direct the intelligent controller to issue control signals, adjust a control schedule, and/or carry out other activities specified by a user through an intermediate-control interface. In the case that the control event is a scheduled control event, such as when the current time corresponds to a time at which a control schedule specifies a control activity to be undertaken, as determined in step 1608, a schedule-control routine is called, in step 1610, to carry out the scheduled control event. When the control event is a schedule-interface event, as determined in step 1612, the intelligent controller invokes a schedule-interaction routine, in step 1614, to carry out the intelligent controller's portion of a schedule-input or schedule-change dialog with the user through a schedule interface. In the case that the control event is a sensor event, as determined in step 1616 a sensor routine is called by the intelligent controller in step 1618 to process the sensor event. Sensor events may include interrupts generated by a sensor as a result of a change in sensor output, expiration of timers set to awaken the intelligent controller to process sensor data of a next-scheduled sensor-data-processing interval, and other such types of events.

As discussed below, there are two special types of events involved in one implementation of a remaining-response-time calculation-and-display functionality. A timeTo event 1620 may occur during P-response data selection and is handled by a call to a timeTo event-handling routine 1622. A timeTo display event may occur during remaining-response-time display, as determined in step 1624, and is handled by a timeTo display event-handling routine called in step 1626. As illustrated in FIG. 16 by the ellipses 1628, many other different types of events may occur and may be handled by the intelligent-controller event handler or event loop illustrated in FIG. 16, including various different error events, power-on and power-off events, controller-reset events, and other events related to controller operation. FIG. 16 also shows a default event handler 1630 that may be invoked to handle unusual or unexpected events.

Figure 17:
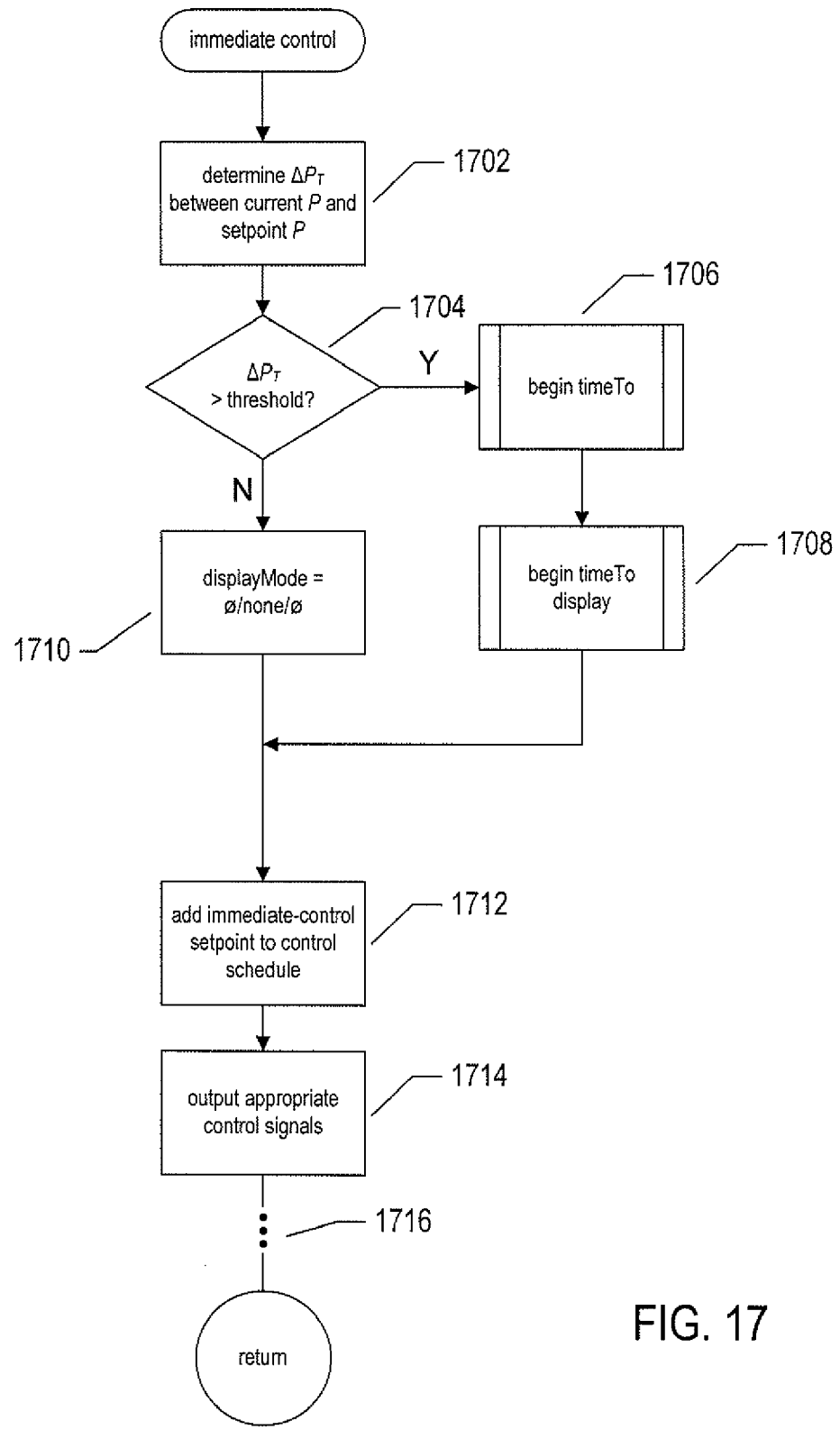
FIGS. 17-19D illustrate, using control-flow diagrams, functionality that allows an intelligent controller, in one implementation, to calculate and display remaining response times, as discussed above with reference to FIGS. 13A-15B.

FIGS. 17-19D illustrate, using control-flow diagrams, functionality that allows an intelligent controller, in one implementation, to calculate and display remaining-response-time values, as discussed above with reference to FIGS. 13A-15B. FIG. 17 illustrates functionality added to the immediate-control routine, called in step 1606 of FIG. 16, following an immediate-control event. This immediate-control routine, shown in FIG. 17, assumes than an immediate-control event generates an immediate-control input. In step 1702, the immediate-control routine determines $\Delta P_T$, or the P-value difference between a currently observed P value and the P value specified by the immediate-control input. When this computed $\Delta P_T$ value is greater than a threshold value, as determined in step 1704, the "begin timeTo" routine is called, in step 170,6 to begin data collection for a next observed P response, and the routine "begin timeTo display" is called in step 1708 to begin continuous, periodic, or intermittent display of a remaining-response-time value. Otherwise, a global variable displayMode is set to the triple ø/none/ø in step 1710 to ensure that display of remaining-response-time values is not initiated. The values stored in the triple are discussed, below. The remaining steps in the immediate-control routine, including steps 1712, 1714, and additional steps represented by ellipses 1716, are not further described, as they are related to receiving and implementing an immediate-control input. Steps similar to steps 1702, 1704, 1706, 1708, and 1710 may also be included at the beginning of the scheduled-control routine shown in step 1610 of FIG. 16.

It should be noted that there may be cases in which multiple immediate-control inputs and scheduled setpoint changes may occur so close together, in time, that additional logic may be needed to ensure that only one P-response data set is collected, generally for the last-occurring immediate-control input or scheduled setpoint change. For simplicity of illustration and clarity of description, it is assumed in the control-flow diagrams and following discussion that no two immediate-control inputs and/or scheduled setpoint changes occur sufficiently close together, in time, for there to be a problem in P-response data overlap and conflicting remaining-response-time displays.

Figure 18A:
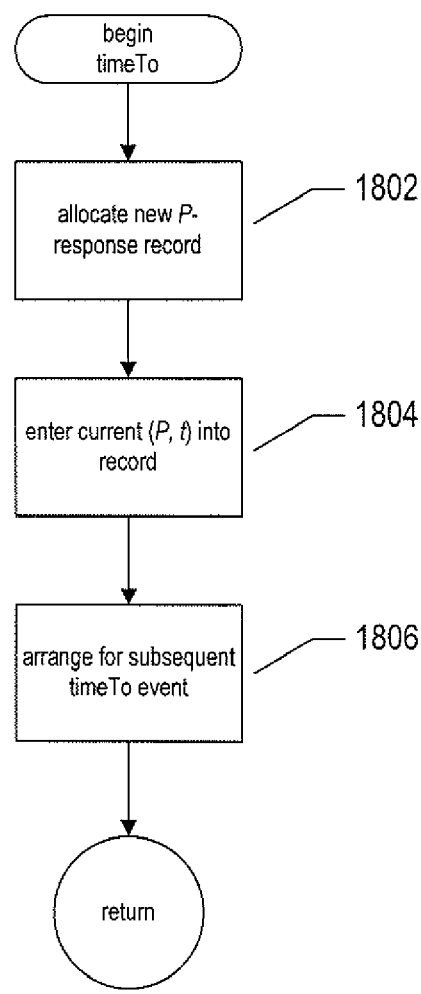

FIGS. 18A-E illustrate, using control-flow diagrams, the P-response data-collection machinery of one implementation of an intelligent controller. FIG. 18A provides a control-flow diagram for the routine "begin timeTo," called in step 1706 of FIG. 17. In step 1804, the routine enters a current P versus t data point into the P-response record. Then, in step 1806, the routine arranges for a subsequent timeTo event, such as setting a timeTo timer or arranging for subsequent interrupt. Thus, the routine "begin timeTo" sets up a P-response record for collecting data during a current response time, enters a first data point into the record, and schedules a next timeTo event for collection of a next data point.

Figure 18B:
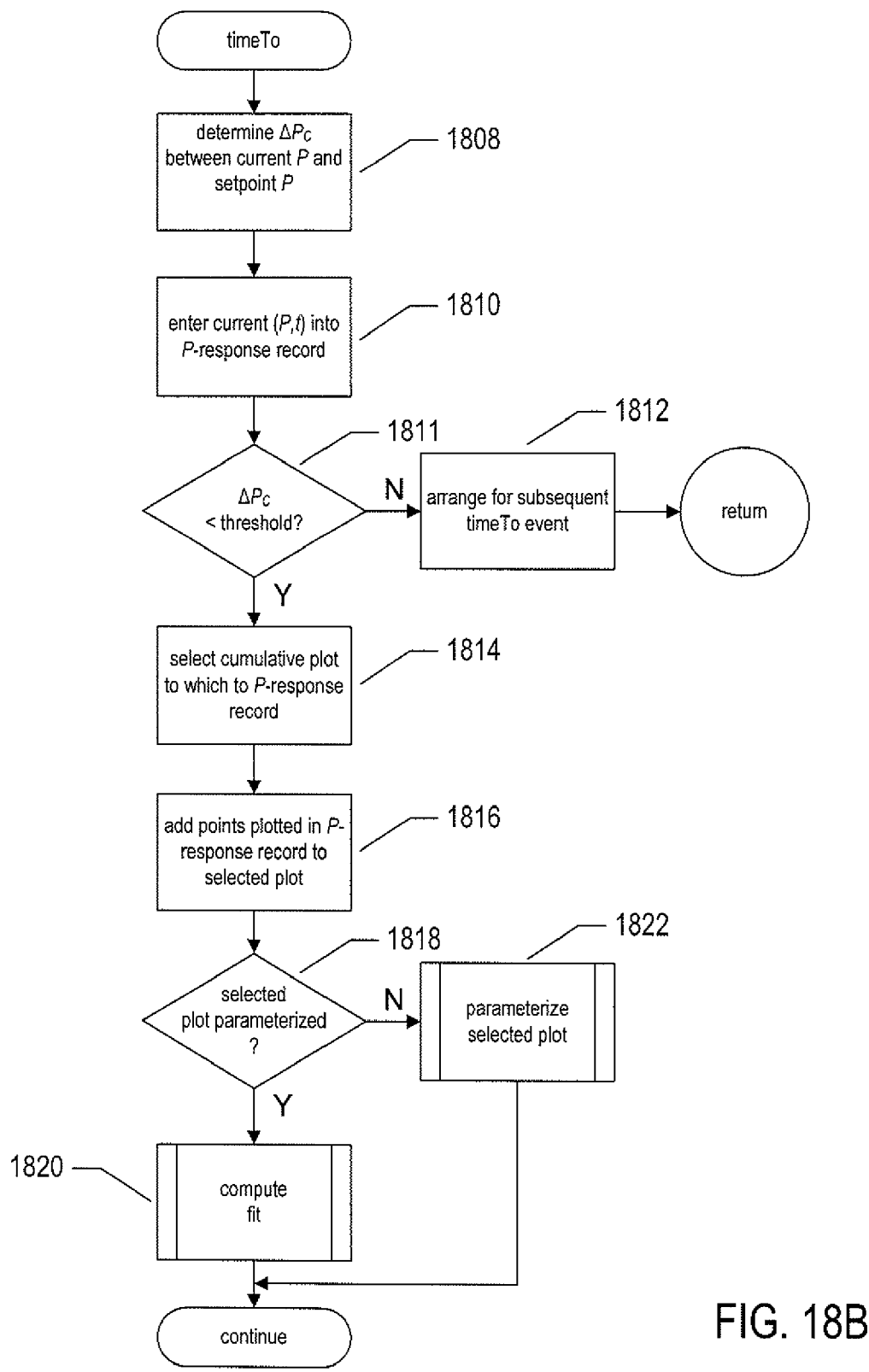
Figure 18C:
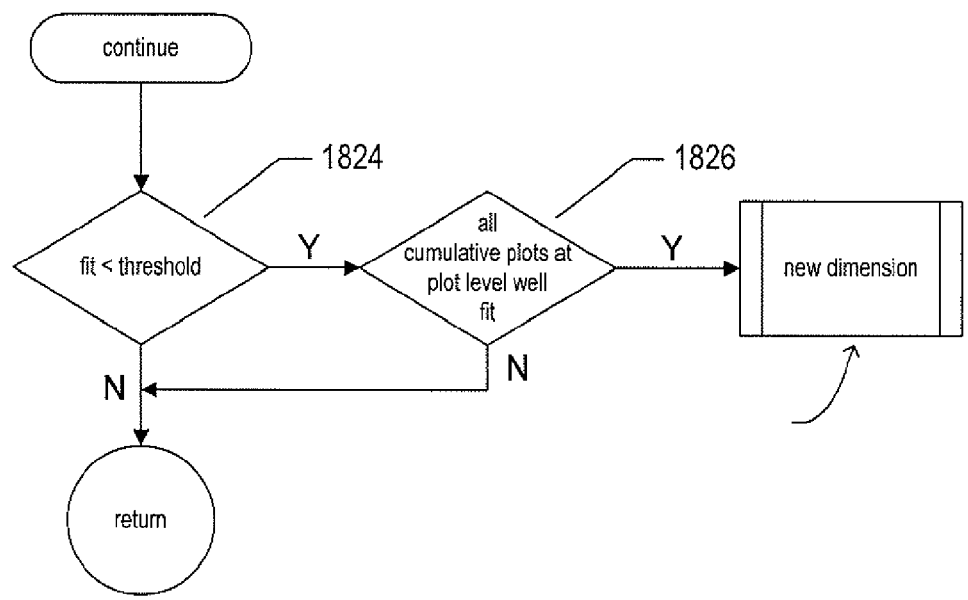

FIGS. 18B-C provide a control-flow diagram for the routine "timeTo" that is called to handle timeTo events in step 1622 in FIG. 16. In step 1808, the routine "timeTo" determines a value $\Delta P_c$ with the magnitude of the P-value difference between the desired setpoint P value and the current P value. Then, in step 1810, the routine "timeTo" enters a next P versus t data point into the P-response record. When $\Delta P_c$ is not less than a threshold value, indicating that there is still substantial time remaining until the desired setpoint P value is obtained, the routine "timeTo" arranges for a subsequent timeTo event, in step 1812, and returns. Otherwise, data collection is finished for the current P-response so, in step 1814, the routine "timeTo" selects a cumulative plot to which to add the data points stored in the P-response record. The selection may involve selecting a plot associated with conditions closest to current conditions, when multiple plots are maintained by the intelligent controller. In step 1816, the routine "timeTo" adds the data points collected for the current P response to the selected cumulative plot. When the selected cumulative plot has been parameterized, as determined in step 1818, then a new fit is computed for the parameterized plot, in step 1820, and associated with the plot. Otherwise, the routine "parameterize selected plot" is called, in step 1822, to attempt to parameterize the cumulative plot to which the data points have been added in step 1816. The routine continues in FIG. 18C. When the fit computed in either of steps 1820 or 1822 is less than a threshold value, as determined in step 1824, and all cumulative plots at the plot level or within the dimension to which the currently considered cumulative plot belongs have similarly low fit values indicating good statistical bases for the parameterized plots, as determined in step 1826, then the routine "new dimension" is called in step 1828 to consider adding a new dimension of global models, as discussed above with reference to FIG. 14E. Note that the thresholds of steps 1811 and 1824 have different values. In control-flow diagrams provided in FIGS. 17-19D, each occurrence of the term "threshold" represents a potentially different numeric value. The threshold of step 1824 is, in addition, a value less than or equal to a threshold included in FIG. 18D, discussed below.

Figure 18D:
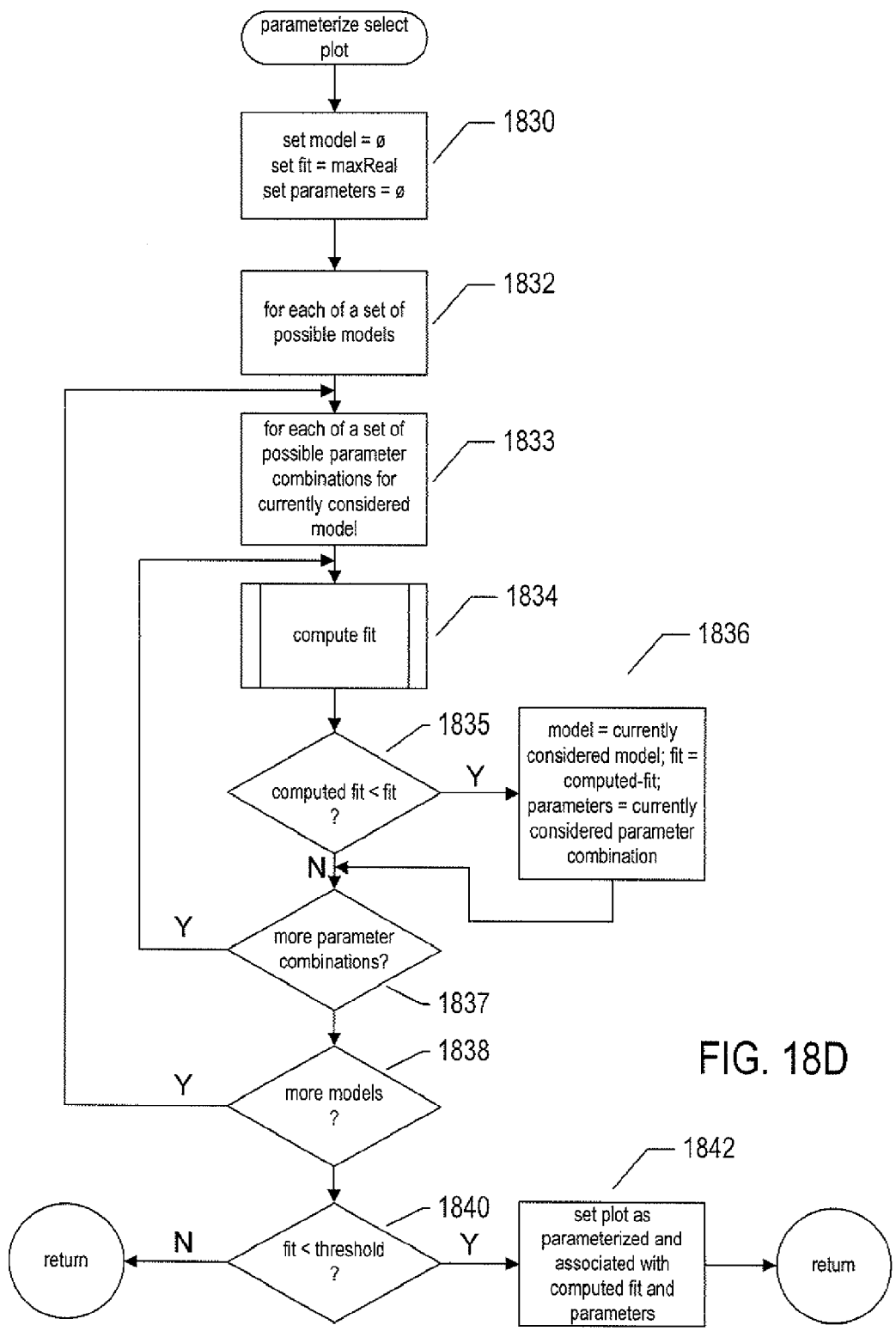

FIG. 18D provides a control-flow diagram for the routine "parameterize selected plot" called in step 1822 of FIG. 18B. In step 1830, the routine initiates a number of local variables, including the variables "model," "fit," and "parameters." Next, in the for-loop of steps 1832-1838, each of a set of possible global models is considered. In the inner, nested for-loop of steps 1833-1837, each of a set of possible parameter combinations for the currently considered model is considered. For example, in the case of the model discussed above with reference to FIG. 14B, various different combinations of the a and b constant parameters for the model would be considered, one at a time, in the for-loop of steps 1833-1837. In step 1834, a fit is computed for the currently considered model and currently considered parameter combination. When the computed fit is less than the fit value stored in the local variable "fit," as determined in step 1835, then the local variable "model" is set to an indication of the currently considered model, the local variable "fit" is set to the computed fit value in step 1834, and the local variable "parameters" is set to the currently considered parameter combination. Following determination of the nested loops of steps 1832-1838, when the value stored in the local variable "fit" is less than a threshold value, as determined in step 1840, then, in step 1842, the cumulative plot selected by the routine "parameterize selected plot" is deemed parameterized and associated with the computed fit value and the parameter combination stored in the local variable "parameters."

Figure 18E:
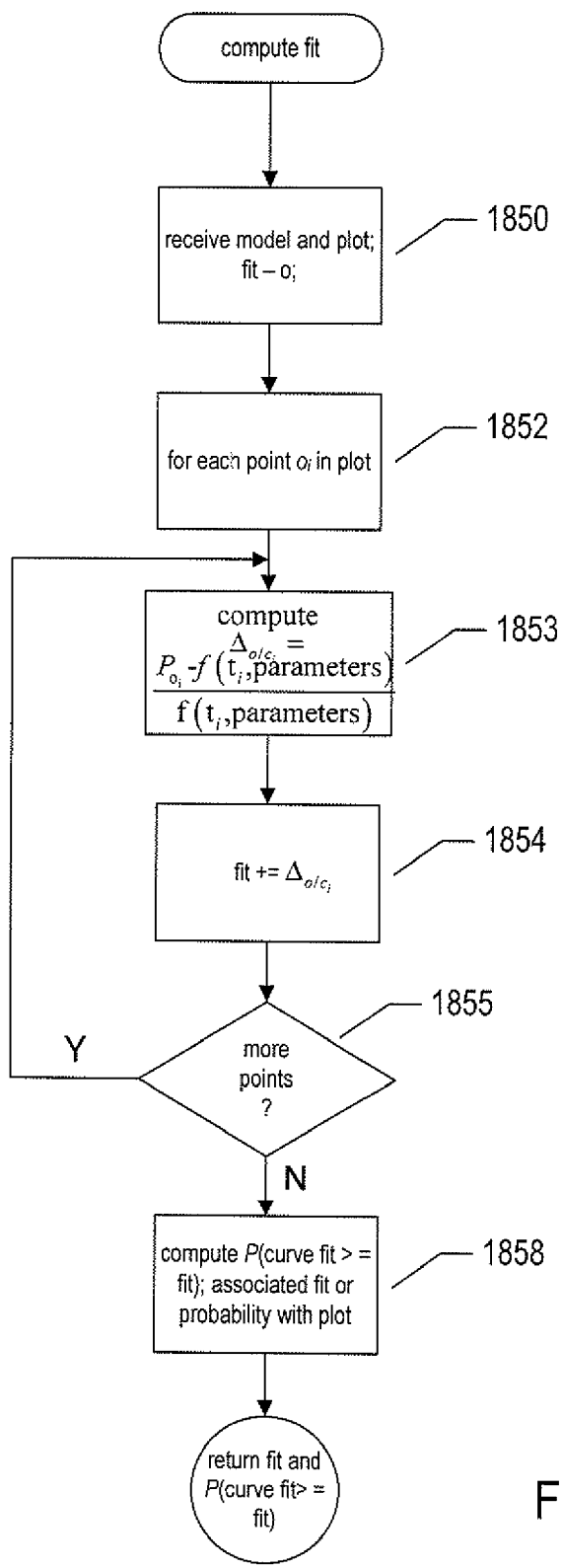

FIG. 18E provides a control-flow diagram for the routine "compute fit" called in step 1834 and in other steps in other of the control-flow diagrams of FIGS. 17-19D. The routine "compute fit" computes a fit value as well as a probability value, as discussed above with reference to FIGS. 14C-D, for a data set with respect to a particular P-response model. The model and data set is received, in step 1850, and the local variable "fit" is set to zero. Then, in the for-loop of steps 1852-1855, the routine "compute fit" considers each data point in a plot, computing the $\Delta_{o/c_i}$ value, as discussed above with reference to FIG. 14C, and adding that value to the local variable "fit." Finally, after termination of the for-loop of steps 1852-1855, a probability value for the computed fit is computed, in step 1858, and the computed fit and probability value are associated with a plot.

Figure 19A:
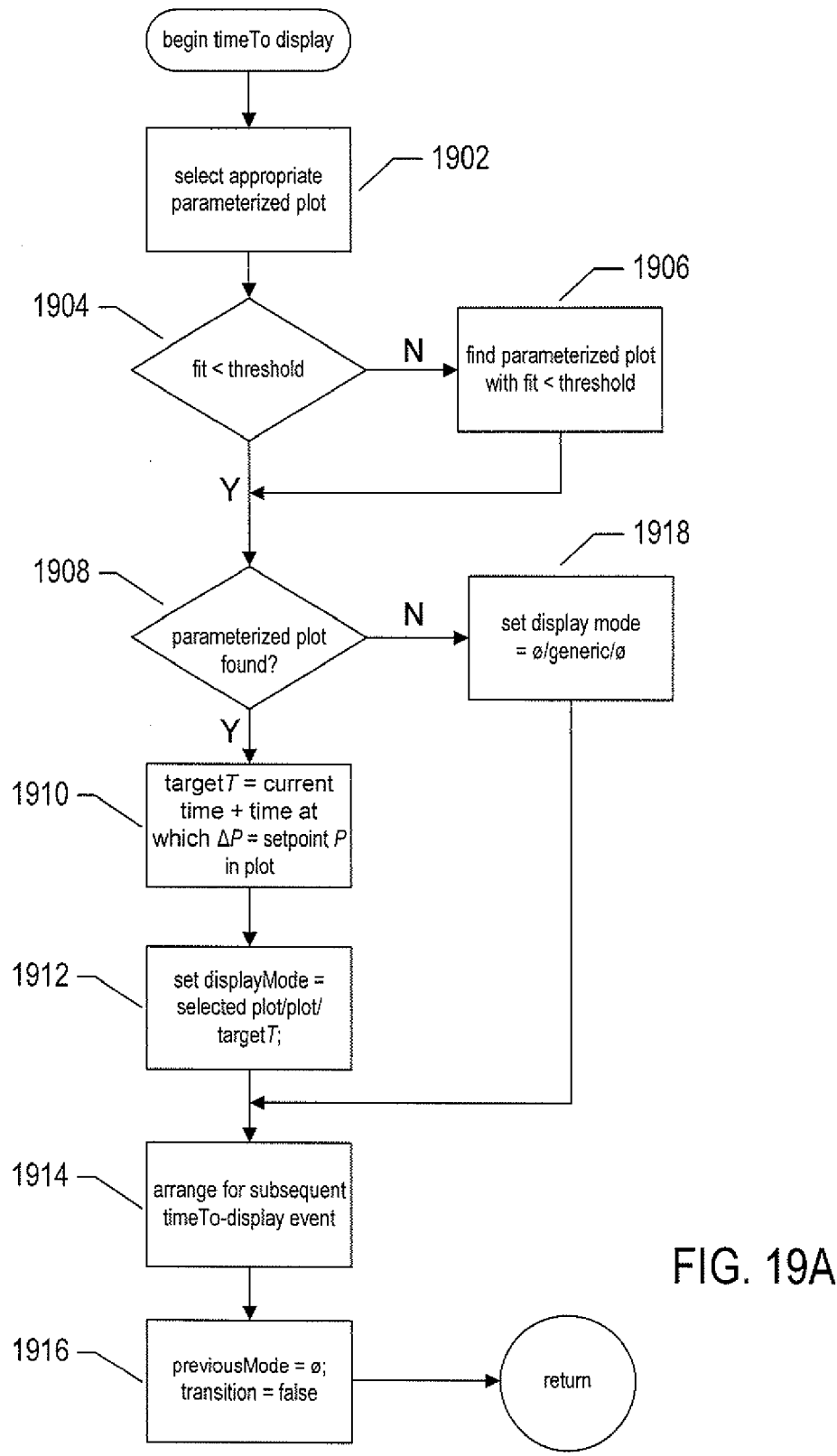

FIGS. 19A-D provide control-flow diagrams for the routines involved in the display of remaining-response-time values by an intelligent controller, in one implementation. FIG. 19A provides a control-flow diagram for the routine "begin timeTo display," called in step 1708 of FIG. 17. This routine initiates the display of remaining-response-time values during a response time following an immediate-control input or scheduled setpoint change. In step 1902, the routine "begin timeTo display" selects an appropriate parameterized plot, or global model, for initial computation of remaining-response-time values. The appropriate parameterized plot may be a single global model, in certain cases, when there is only one statistically meaningful global model, or, when multiple global models have been prepared, is the global model associated with parameters and characteristics closest to those at the current time. When the fit associated with the parameterized plot is less than a threshold value, as determined in step 1904, the parameterized plot has been statistically validated and can be used for remaining-response-time calculations. Otherwise, in step 1906, the routine attempts to find a different parameterized plot with an associated fit value less than the threshold value. When a statistically meaningful parameterized plot has been found in either of steps 1902 or 1906, as determined in step 1908, then, in step 1910, a targetT value is computed as the current time plus the time at which $\Delta P$ reaches the setpoint P value in the selected parameterized plot. Then, in step 1912, the global variable "displayMode" is set to a triplet that includes an indication of the selected parameterized plot, the mode value "plot," and the computed targetT. In step 1914, the routine "begin timeTo display" arranges for a subsequent timeTo-display event and then, in step 1916, sets the local variable "previousMode" to the null triplet and sets the global variable "transition" to FALSE. When a statistically meaningful parameterized plot is not found, as determined in step 1908, the display mode is set to a triplet including no values for the selected parameterized plot and targetT and a mode of "generic," in step 1918.

Figure 19B:
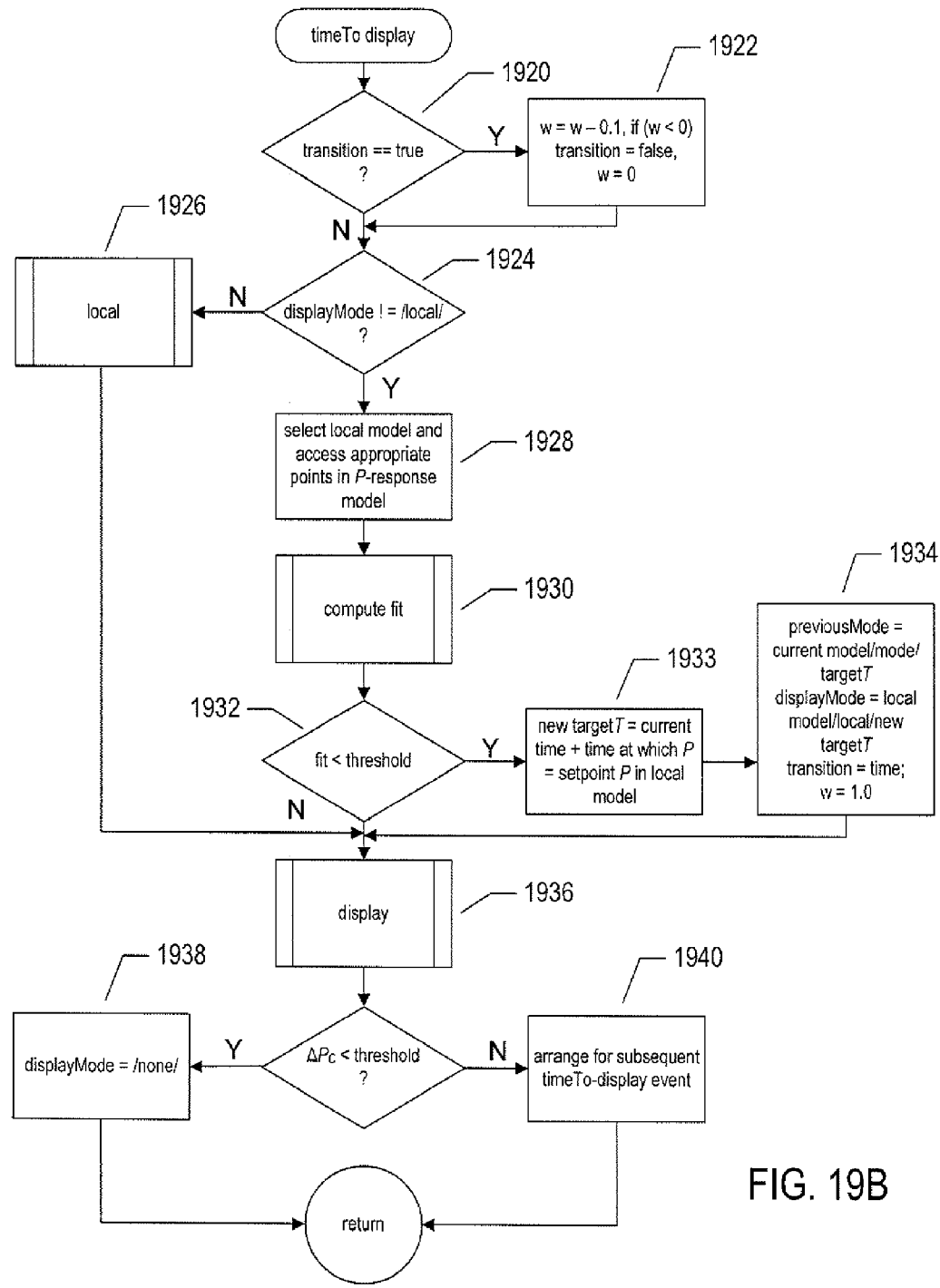

FIG. 19B provides a control-flow diagram for the routine "timeTo display" called to handle a timeTo-display event, in step 1626 of FIG. 16. In step 1920, the routine "timeTo display" determines whether the global variable "transition" is TRUE. When the global variable "transition" is TRUE, then the global variable "w" is decremented, in step 1922 and, when the value stored in the variable "w" after decrementing the variable "w" is less than 0, the global variable "transition" is set to FALSE and the global variable "w" is set to 0. The global variable "w" is used, during a transition period, to weight contributions to a computed remaining-response-time value from a current model and a previous model, when a previous model exists. This is further discussed, below, with reference to FIG. 19B. Next, in step 1924, the routine "timeTo display" determines whether or not the displayMode global variable includes a mode value "local." When the displayMode global variable includes the mode value "local," as determined in step 1924, a local model, as discussed above with reference to FIGS. 15A-B, is currently being used for remaining-response-time calculations. In that case, the routine "local" is called, in step 1926. Otherwise, either no model or a global model is currently being used to compute remaining-response-time values. In that case, the routine "timeTo display" attempts to determine a local model to which to transition for subsequent remaining-response-time calculations. In step 1928, a local model is selected and the P-response record currently collecting data points of the current P response is accessed. In step 1930, the routine "compute fit" is called to compute a fit for the local model with respect to currently collected data points for the current P response. When the fit is less than a threshold value, as determined in step 1932, then, in step 1933, the routine "timeTo display" computes a new targetT value for the local model selected in step 1928 and, in step 1934, the previousMode global variable is set to the value of the displayMode global variable and the displayMode global variable is updated to have the value of a triplet that includes an indication of the local model selected in step 1928, the mode "local," and a new targetT value computed for the local model in step 1933. The routine "local," called in step 1926, and described below with reference to FIG. 19C, either maintains continued use of the current local model or transitions back to a global model, new local model, or no model. In step 1936, the routine "display" is called in order to update the display of the remaining-response-time value by the intelligent controller. When the $\Delta P_c$ value, computed in step 1808 of FIG. 18B, is less than a threshold value, then the mode field of the displayMode global variable is set to "none," in step 1938, to discontinue display of remaining-response-time values. Otherwise, in step 1940, the routine "timeTo display" arranges for a subsequent timeTo-display event.

Figure 19C:
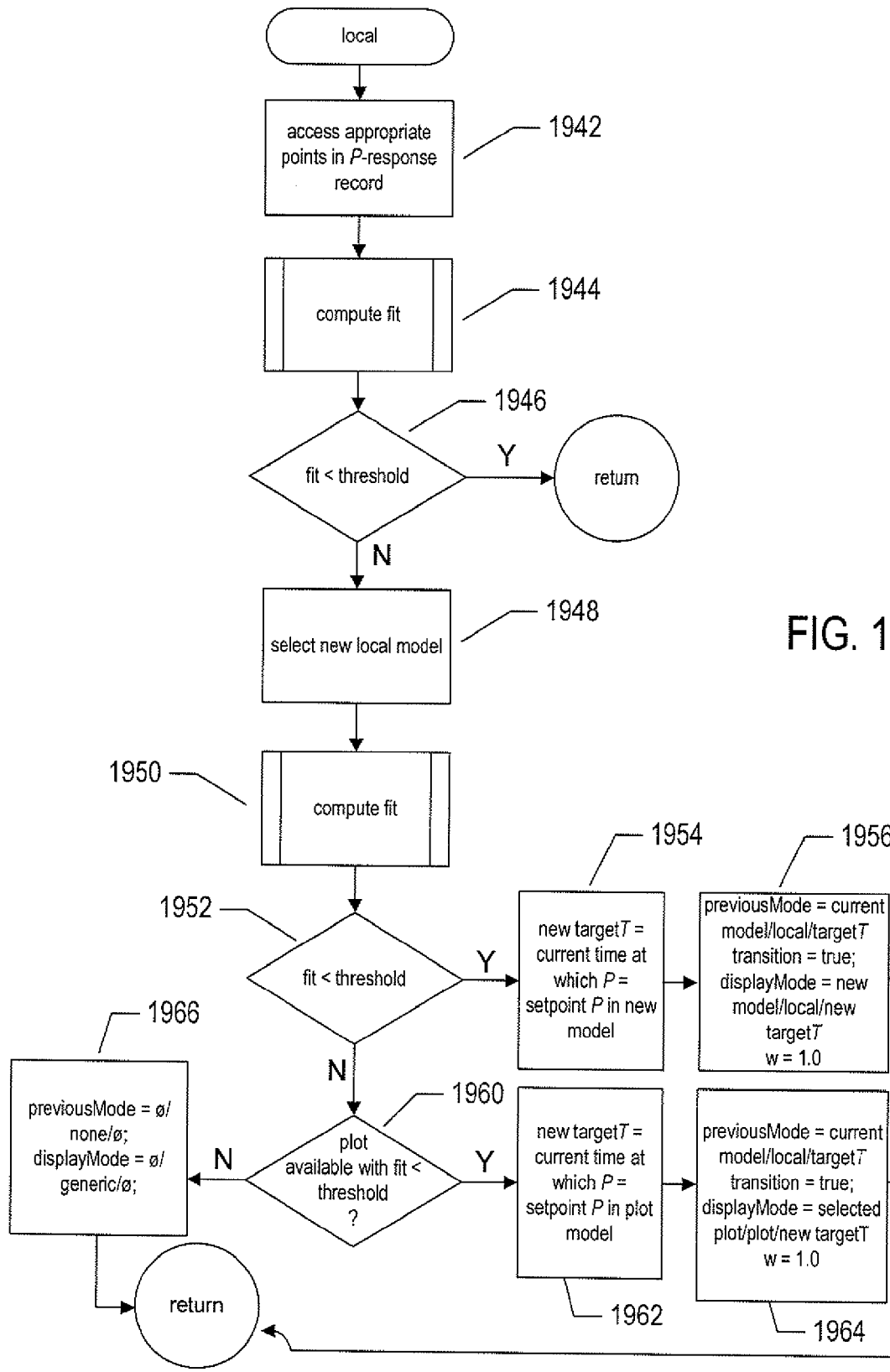

FIG. 19C provides a control-flow diagram for the routine "local" called in step 1926 of FIG. 19B. In steps 1942 and 1944, the routine "local" accesses the current P-response record and computes a fit for the currently used local model with respect to the data points in the current P-response record. When the fit is lower than a threshold value, as determined in step 1946, the local model remains statistically valid, and the routine "local" returns. Otherwise, in step 1948, the routine "local" selects a new local model and computes a fit for the new local model with respect to the current data points in the P-response record, in step 1950. When the fit is less than a threshold value, as determined in step 1952, then, in step 1954, a new targetT value is computed for the new local model and, in step 1956, the global variable "previousMode" is set to the current value of the global variable "displayMode," the global variable "displayMode" is set to a triple that includes an indication of the new local model, the mode "local," and the new targetT value computed in step 1954, global variable "w" is set to 1.0, and the global variable "transition" is set to TRUE. When the new local model is not less than the threshold value, as determined in step 1952, then when a parameterized plot is available with an associated fit value less than the threshold value, as determined in step 1960, then, in step 1962, a new targetT value is computed and, in step 1964, the global variables "previousMode," "transition," "displayMode," and "w" are updated to select the parameterized plot as the current model in similar fashion to the update of these local variables in step 1956. Otherwise, in step 1966, the current display mode is set to the mode "generic."

Figure 19D:
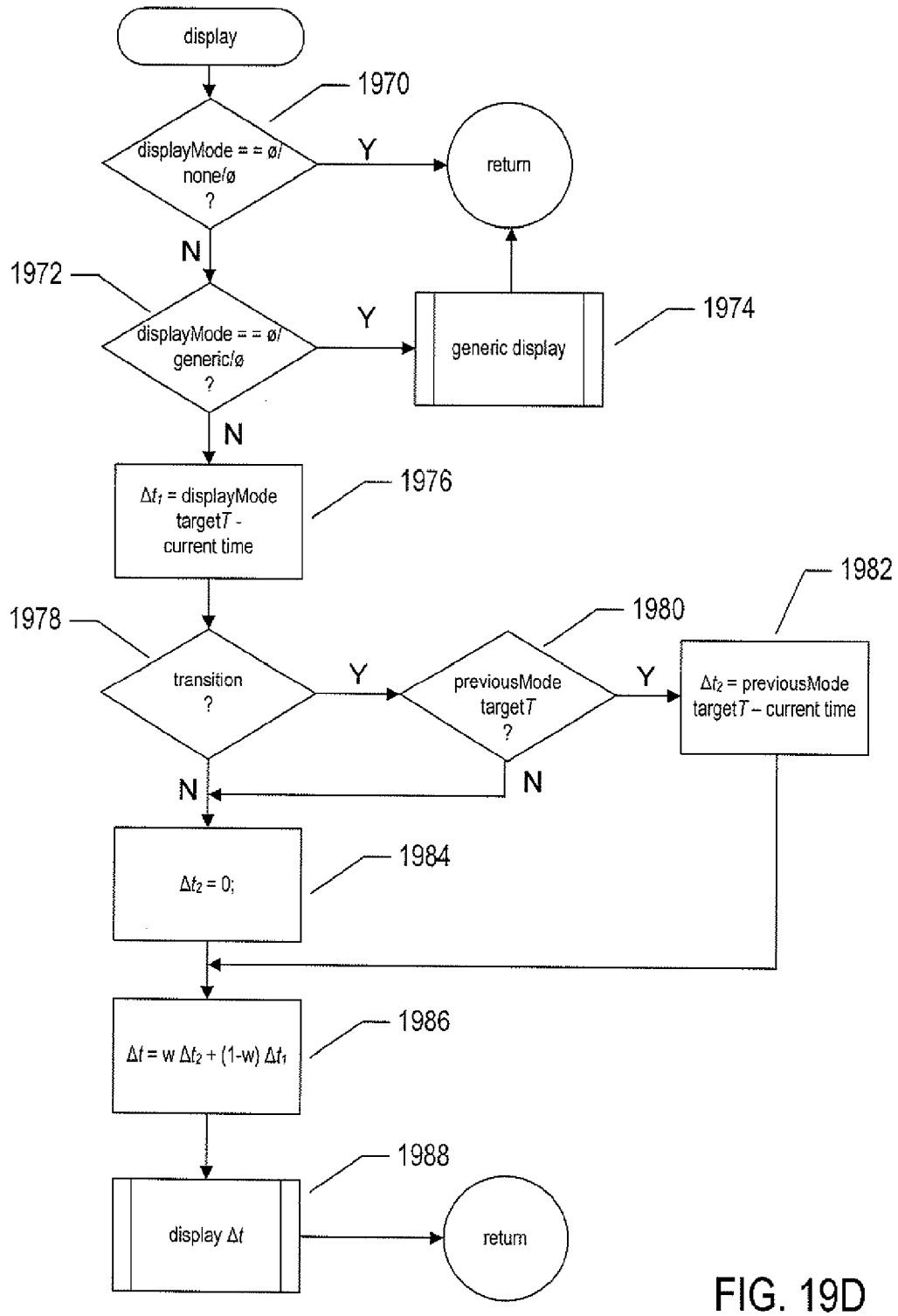

FIG. 19D provides a control-flow diagram for the routine "display," called in step 1936 of FIG. 19B. When the current display mode, stored in the global variable "displayMode," is "none," as determined in step 1970, then the routine "display" returns, since no remaining-response-time value is currently being displayed. Otherwise, when the display mode is "generic," as determined in step 1972, then a routine "generic display" is called in step 1974 to display a directional indication or other generic display, rather than a remaining-response-time value. For example, in the case of an intelligent controller controlling a furnace, the intelligent controller may display the word "heating" rather than a remaining-response-time value when the intelligent controller is unable to accurately calculate a remaining-response-time value for lack of a reasonable model. Otherwise, when the display mode is either "local" or "global," the routine "display" computes a value $\Delta t_1$ 1976 as the different between the targetT time stored in the display mode local variable and the current time. When the global variable "transition" is true, as determined in step 1978, and when there is a previous model, values for which are stored in the global variable "previousMode" as determined in step 1980, then the routine "display" computes a second value $\Delta t_2$ as the difference between the previous-model targetT and the current time, in step 1982. Otherwise, the value $\Delta t_2$ is set to zero, in step 1984. In step 1986, the routine "display" computes a $\Delta t$ value as the remaining-response-time value. The remaining-response-time value is computed as a weighted combination of $\Delta t_2$ based on the previous model and $\Delta t_1$ based on the current model. Initially, this calculation is weighted towards the previous model but, as time passes, the global variable "w" is continuously decremented in step 1922 of FIG. 19D, to increasingly provide greater weight to the remaining-response-time value computed from the current model. Ultimately, the remaining-response-time value is computed only from the current model. Finally, in step 1988, the routine "display" calls a display $\Delta t$ routine that displays the computed remaining-response-time value on a display component of the intelligent controller or to a remote device by the intelligent controller.

It should be noted that the intelligent controller computes remaining-response-time values and stores the computed remaining-response-time values in at least one memory prior to transferring the computed remaining-response-time values to local or remote display devices. Remaining-response-time values are generally transferred through cables, wires, optical fibers, and air.

Figure 20A:
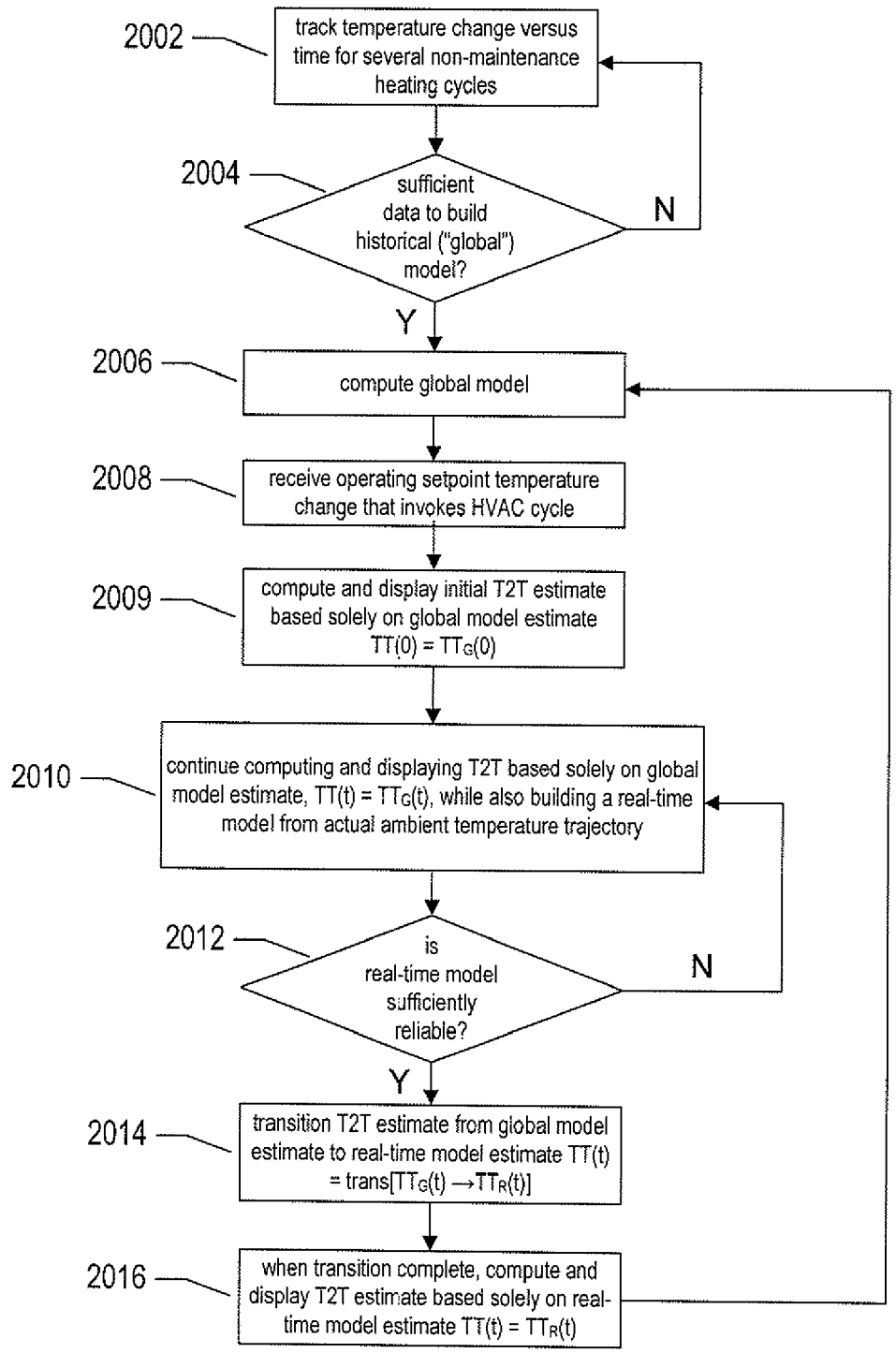
FIG. 20A illustrates steps for time to temperature computation in one intelligent-thermostat implementation.

Methods and Implementations for Calculating, Storing, and Displaying Projections of the Time Remaining for Completion of Input Control Tasks in the Context of an Intelligent Thermostat FIG. 20A illustrates steps for time to temperature computation in one intelligent-thermostat implementation. The phrase "time to temperature" ("T2T") refers to an estimate of the time remaining from the current point in time until a target temperature is reached. In view of the variety of factors that can affect the course of a temperature trajectory over a particular real-world heating, ventilation, and air-conditioning ("HVAC") cycle, the methods, described below, have been found to yield good T2T estimations. Moreover, in the face of the many real-world variations that can occur, some predictable and others not so predictable, the currently described methods for selective display of the T2T information have been found to provide a valuable information-display feature to intelligent-thermostat users. The T2T estimates are displayed, when accurate estimates can be obtained, on a display interface, such as display interface 410 shown in FIG. 4. When accurate estimates cannot be obtained, a generic display of temperature-change direction, such as "heating" or "cooling," may instead be displayed, or, alternatively, no T2T or generic display may be provided.

According to one implementation, the intelligent thermostat's T2T algorithm is invoked during a learning phase that occurs soon after first installation or factory reset. The intelligent thermostat begins to build and maintain its own database of T2T-related information, which is customized for a particular controlled environment and particular HVAC system that heats and cools the controlled environment, during a normal course of operation. In general, the intelligent thermostat controls the HVAC system according to a control schedule and immediate-control inputs, with significant $\Delta T$ changes and corresponding response times occurring at or before scheduled setpoint changes and after immediate-control inputs, and generally insignificant $\Delta T$ changes occurring during periods of time between setpoints and immediate-control inputs, when the intelligent thermostat seeks to maintain a specified temperature or temperature range. In one implementation, the intelligent thermostat, for each learning cycle comprising a predetermined number of heating or cooling cycles, such as 10 heating or cooling cycles, automatically tracks the temperature change $\Delta H(t)$ versus time t, where t=0 represents the beginning of the heating cycle.

After a suitable number of learning cycles, a sufficient amount of data is available to automatically generate a global model for the controlled environment. The global model can subsequently be continuously improved using more data points, as time goes forward, since each heating cycle represents yet another experiment. For one implementation, the time span of the global model can be limited to only a recent period, such as the most recent 30 to 60 days, so that it will be more likely to reflect the effects of the current season of the year.

Figure 20B:
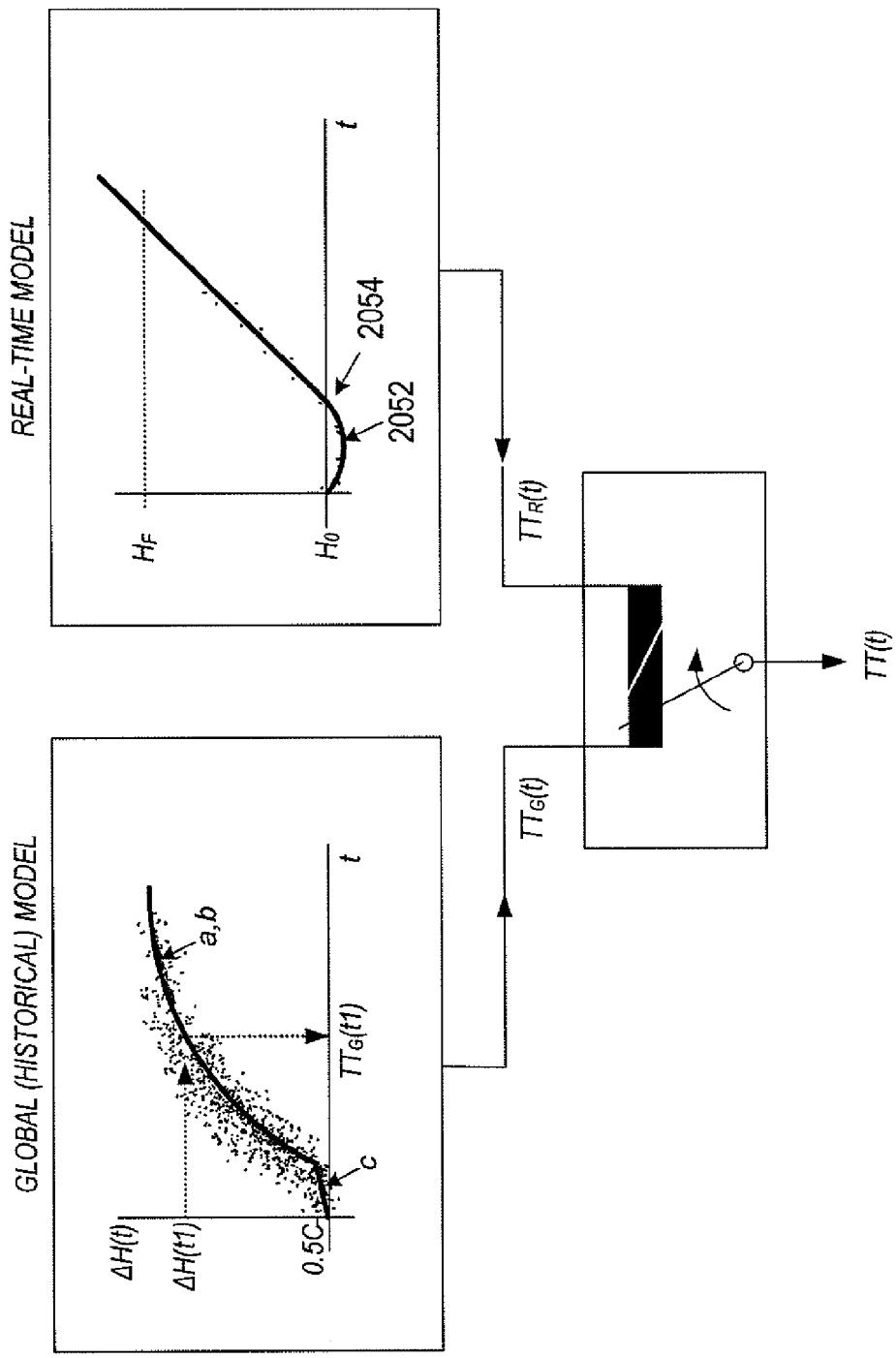
FIG. 20B provides a diagram that includes a plot of the global model.

FIG. 20B provides a diagram that includes a plot of the global model. The global model may be a single-parameter straight line between $\Delta H=0$ and $\Delta H=0.5$ degrees C. followed by a two-parameter curve beyond that point.

Referring again to FIG. 20A, at step 2008 the T2T algorithm is put into use when the current operating setpoint temperature is changed from an initial value $H_0$ to a desired final value $H_F$. This setpoint change can be invoked by a user by using either a walk-up dial or a remote network access facility, or alternatively can be invoked by a scheduled setpoint change that changes the current operating setpoint temperature. At step 2012, an initial estimate T2T (0) is computed using only the global model, by mapping the value $H_F-H_0=\Delta H(0)$ into T2T(0) using the global model shown in FIG. 20B. This initial estimate, which can be called a global-model initial estimate, can be shown immediately on the intelligent thermostat display, even in real time as the user turns the dial for the case of a manual walk-up setpoint change.

At step 2010, in what will usually last over the next several minutes of the heating cycle, a global-model estimate continues to be used to provide the current time to temperature estimate TT(t) by mapping the current measured room temperature H(t) into TT(t) using the global model. The global model T2T estimate is denoted "$TT_G(t)$." The actual room temperature values H(t) can be provided at regular periodic intervals, such as every 30 seconds, by the intelligent thermostat sensing circuitry. In one implementation, during the time period in which the global estimate is being used for display purposes, a real-time model R is built up by tracking the current value of $\Delta H(t)=H(t)-H_0$ versus time. The real-time model R, which can alternatively be called a "local model," does not become useful for purposes of T2T estimation until a statistically meaningful linear function fitting the real-time data can be constructed, often not until there has been a certain predetermined empirically-established rise in temperature, such as 0.2 degrees C., at a point 2054 following a lowest point 2052 in trajectory of H(t). One empirically-established guideline that has been found useful is to wait until 10 temperature samples spaced 30 seconds apart subsequent to the 0.2 degree C. post-nadir rise point 2054 have been collected. In one implementation, the real-time model R can be used to establish a real-time model estimate by using a straight-line projection onto the target temperature line, as shown in FIG. 20B. The real-time model T2T estimate is denoted "$TT_R(t)$." For one implementation, only the latest 10 temperature samples are used to project the straight line that computes the real-time estimate $TT_R(t)$. In other implementations, all of the data points subsequent to the point 2054 can be used to compute the $TT_R(t)$.

When, in step 2012, it is determined that the real-time model estimate $TT_R(t)$ is not sufficiently reliable, then step 2010 repeats until such time as $TT_R(t)$ is sufficiently reliable, whereupon step 2014 is carried out. A smooth transition between the global-model estimate $TT_G(t)$ real-time model estimate $TT_R(t)$ occurs in step 2014, so that there is no jump in the actual value of TT(t), which can be disconcerting to a user who is viewing the display, the transition being summarized as $TT(t)=TRANS[TT_G(t) \rightarrow TT_R(t)]$. The transition can be achieved in a variety of ways. In one implementation, the transition is performed as a straight-line transition from one curve to the other, where the transition occurs at a rate of not more than 10 seconds per second. Once the transition is complete, the real-time estimate alone can be used, in step 2016, until the end of the cycle.

As indicated in FIG. 20A, following the end of the cycle at step 2016, the global model may be recomputed, at step 2006, so that the most recent historical data can be leveraged prior to instantiation of the next heating cycle. Alternatively, the global model can be recomputed once every several cycles, once per day, or on some other periodic basis.

Preferably, there are plural safeguards incorporated along with the steps 2014-2016 to ensure that the displayed T2T estimate makes sense. When the safeguards indicate a state of unreliability or other such problem for the real-time model estimate, the T2T display may be turned off, and instead of a time reading, a generic display, such as the term "heating," may be undertaken. For example, when the statistical deviation of the data samples from a straight line subsequent to point 2054 is greater than a certain threshold, the T2T display may be turned off. Likewise, when the real-time model estimate of T2T starts growing for an extended period of time, or indicates an unreasonably large number, the T2T display is turned off.

Although the present invention has been described in terms of particular examples, it is not intended that the invention be limited to these examples. Modifications within the spirit of the invention will be apparent to those skilled in the art. For example, intelligent-controller logic may include logic-circuit implementations, firmware, and computer-instruction-based routines and program implementations, all of which may vary depending on the selected values of a wide variety of different implementation and design parameters, including programming language, modular organization, hardware platform, data structures, control structures, and many other such design and implementation parameters. The remaining-response-time determinations and displays may be directed to many different types of control scenarios and environmental parameters, as discussed above, including multiple different parameters. These determinations and displays may include graphical, textural, and numeric representations of the remaining response time as well as the remaining response time relative to a total response time, the remaining response time as well as the already transpired response time, estimated changes in value of other parameters during the response time, and many other types of information. The remaining response times determined by an intelligent controller can be used for a variety of additional purposes and determinations made by an intelligent controller.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. A method of calculating a time-to-temperature estimate for a thermostat controlling an HVAC system, the method comprising:
  receiving a first temperature representing a current temperature of an enclosure;
  receiving a second temperature representing a target temperature of the enclosure;
  computing a first component of an estimated time representing an estimated time to transition the temperature in the enclosure from the first temperature to the second temperature by the HVAC system, wherein the first component is computed based on:
    a plurality of historical time and temperature values recorded from one or more previous temperature change cycles of the enclosure; and
    at least one external factor selected from a group consisting of: an outside temperature, an outside sunlight amount, an outside wind velocity, and a time of day;
  computing second component of the estimated time based on a current trajectory of time and temperature values as the enclosure transitions from the first temperature to the second temperature;
  computing the estimated time based on the first component of the estimated time and the second component of the estimated time; and causing the estimated time to be displayed on a display device.

2. The method of claim 1, wherein computing the estimated time based on the first component of the estimated time and the second component of the estimated time comprises:
   multiplying the first component of an estimated time by a first weighting factor to produce a first product;
   multiplying the second component of an estimated time by a second weighting factor to produce a second product; and
   adding the two products to generate the aggregate estimated time.

3. The method of claim 2, wherein the sum of the first weighting factor and the second weighting factor is 1.

4. The method of claim 2, wherein:
   the first weighting factor is initially set to a larger value than the second weighting factor; and
   the first weighting factor is incrementally decreased while the second weighting factor is correspondingly incrementally increased as the enclosure transitions from the first temperature to the second temperature.

5. The method of claim 1, wherein computing second component of the estimated time comprises selecting a model from among two or more preexisting models.

6. The method of claim 1, wherein selecting a model from among two or more preexisting models:
   first selecting a set of candidate models based on data collected during time periods with characteristics similar to characteristics of a current time interval; and
   selecting, from among the candidate models, a model with a computed fit that indicates that the model fits the recorded temperature-versus-time data points better than the other candidate models.

7. The method of claim 1, wherein computing the second component of the estimated time comprises generating a model based on measured temperature changes with respect to time recorded during a current time interval.

8. The method of claim 1, further comprising:
   initially selecting, as a current model, a single model computed from measured temperature changes with respect to time recorded during previous time intervals in which the HVAC system was controlled to change the ambient temperature; and
   subsequently selecting, as a next current model, one of an aggregate model or a single model for the change in temperature with respect to time during control by the HVAC system.

9. The method of claim 1, further comprising computing a fitness metric computed for the trajectory of time and temperature values with respect to a model.

10. The method of claim 1, wherein the second temperature is received from a control schedule stored in memory that includes one or more setpoint temperature values.

11. A thermostat for calculating a time-to-temperature estimate for a thermostat controlling an HVAC system, the thermostat comprising:
   a display device;
   one or more temperature sensors for measuring a first temperature representing a current temperature of an enclosure;
   an input interface for receiving a second temperature representing a target temperature of the enclosure; and
   one or more processors programmed to perform operations comprising:
      computing a first component of an estimated time representing an estimated time to transition the temperature in the enclosure from the first temperature to the second temperature by the HVAC system, wherein the first component is computed based on:
         a plurality of historical time and temperature values recorded from one or more previous temperature change cycles of the enclosure; and
         at least one external factor selected from a group consisting of: an outside temperature, an outside sunlight amount, an outside wind velocity, and a time of day;
      computing second component of the estimated time based on a current trajectory of time and temperature values as the enclosure transitions from the first temperature to the second temperature;
      computing the estimated time based on the first component of the estimated time and the second component of the estimated time; and
      causing the estimated time to be displayed on a display device.

12. The thermostat of claim 11, wherein computing the estimated time based on the first component of the estimated time and the second component of the estimated time comprises:
   multiplying the first component of an estimated time by a first weighting factor to produce a first product;
   multiplying the second component of an estimated time by a second weighting factor to produce a second product; and
   adding the two products to generate the aggregate estimated time.

13. The thermostat of claim 12, wherein the sum of the first weighting factor and the second weighting factor is 1.

14. The thermostat of claim 12, wherein:
   the first weighting factor is initially set to a larger value than the second weighting factor; and
   the first weighting factor is incrementally decreased while the second weighting factor is correspondingly incrementally increased as the enclosure transitions from the first temperature to the second temperature.

15. The thermostat of claim 11, wherein computing second component of the estimated time comprises selecting a model from among two or more preexisting models.

16. The thermostat of claim 11, wherein selecting a model from among two or more preexisting models:
   first selecting a set of candidate models based on data collected during time periods with characteristics similar to characteristics of a current time interval; and
   selecting, from among the candidate models, a model with a computed fit that indicates that the model fits the recorded temperature-versus-time data points better than the other candidate models.

17. The thermostat of claim 11, wherein computing the second component of the estimated time comprises generating a model based on measured temperature changes with respect to time recorded during a current time interval.

18. The thermostat of claim 11, wherein the one or more processors are further programmed to perform operations comprising:
   initially selecting, as a current model, a single model computed from measured temperature changes with respect to time recorded during previous time intervals in which the HVAC system was controlled to change the ambient temperature; and
   subsequently selecting, as a next current model, one of an aggregate model or a single model for the change in temperature with respect to time during control by the HVAC system.

19. The thermostat of claim 11, wherein the one or more processors are further programmed to perform operations comprising computing a fitness metric computed for the trajectory of time and temperature values with respect to a model.

20. The thermostat of claim 11, wherein the second temperature is received from a control schedule stored in memory that includes one or more setpoint temperature values.

* * * * *

UNITED STATES PATENT AND TRADEMARK OFFICE
CERTIFICATE OF CORRECTION

PATENT NO. : 9,448,568 B2  
APPLICATION NO. : 14/307359  
DATED : September 20, 2016  
INVENTOR(S) : Yoky Matsuoka et al.

Page 1 of 1

It is certified that error appears in the above-identified patent and that said Letters Patent is hereby corrected as shown below:

In the Claims

In Column 27, Line 14, Claim 3: after "2," before "the" please insert --wherein--

In Column 28, Line 31, Claim 13: after "12," before "the" please insert --wherein--

Signed and Sealed this
Thirty-first Day of January, 2017

Michelle K. Lee
*Director of the United States Patent and Trademark Office*